United States Patent
DeFelice

(10) Patent No.: US 10,902,214 B2
(45) Date of Patent: Jan. 26, 2021

(54) NATURAL LANGUAGE GENERATION USING PINNED TEXT AND MULTIPLE DISCRIMINATORS

(71) Applicant: Jungle Disk, L.L.C., San Antonio, TX (US)

(72) Inventor: Michael DeFelice, San Antonio, TX (US)

(73) Assignee: Jungle Disk, L.L.C., San Antonio, TX (US)

( * ) Notice: Subject to any disclaimer, the term of this patent is extended or adjusted under 35 U.S.C. 154(b) by 0 days.

(21) Appl. No.: 16/746,889

(22) Filed: Jan. 19, 2020

(65) Prior Publication Data

US 2020/0151396 A1    May 14, 2020

Related U.S. Application Data

(63) Continuation of application No. 15/885,807, filed on Jan. 31, 2018, now Pat. No. 10,540,446.

(51) Int. Cl.
| | |
|---|---|
| *G06F 40/30* | (2020.01) |
| *G06N 3/04* | (2006.01) |
| *G06N 7/00* | (2006.01) |
| *G06N 3/08* | (2006.01) |
| *G06F 40/56* | (2020.01) |
| *G06F 40/211* | (2020.01) |

(52) U.S. Cl.
CPC ............ *G06F 40/30* (2020.01); *G06F 40/211* (2020.01); *G06F 40/56* (2020.01); *G06N 3/0445* (2013.01); *G06N 3/084* (2013.01); *G06N 7/005* (2013.01)

(58) Field of Classification Search
None
See application file for complete search history.

(56) References Cited

U.S. PATENT DOCUMENTS 6,115,482 A * 9/2000 Sears ................. G06F 3/011
                                                         348/62
2017/0193459 A1* 7/2017 Crasso ............. G06Q 10/1097

* cited by examiner

*Primary Examiner* — Quynh H Nguyen
(74) *Attorney, Agent, or Firm* — Dykema Gossett PLLC

(57) ABSTRACT

A personality model is created for a population and used as an input to a text generation system. Alternative texts are created based upon the emotional effect of the generated text. Certain words or phrases are "pinned" in the output, reducing the variability of the generated text so as to preserve required information content, and a number of tests provide input to a discriminator network so that proposed outputs both match an outside objective regarding the information content, emotional affect, and grammatical acceptability. A feedback loop provides new "ground truth" data points for refining the personality model and associated generated text.

5 Claims, 17 Drawing Sheets

Sample Text (101)

Why your older firewall may no longer protect you from today's threats.

Your firewall may still be supported by your vendor, but it may not be enough to protect your business. Traditional firewalls block connections into and out of your network based on the rules that you apply. That is helpful, but it isn't enough. Traditional firewalls don't block the malware that comes in through a legitimate connection or is already inside your network. Companies are losing money and customers because someone inside the walls opens a malicious email message.

To block malware, phishing and other attacks, you need a device that can both "read" your network and "learns" whether the email that is coming in is safe, or whether it is the first wave of an attack. Upgrading to a unified threat firewall can help protect your business networks from malware and attacks that traditional firewalls may miss. Contact us today to learn how a data security suite can keep you safe.

Statistics (103):
- 163 words
- 968 characters
- 1 topic paragraph
- 2 message paragraphs

Personality (105):
- Extraversion: -.2
- Emotional stability: -.1
- Agreeableness: .3
- Conscientiousness: .8
- Openness: .2

Grammar (107):
- Err: No Space After Punctuation
- Err: Two spaces
- Suggest: Insert serial comma
- Suggest: Remove low information construct

Readability (109):
- Flesch Reading Ease score: 57.7
- Flesch-Kincaid Grade Level: 9.7
- Gunning Fog: 12.6
- Coleman-Liau Index: 11
- SMOG Index: 9.1
- Automated Readability Index: 10.3
- Linsear Write Formula: 11.5
- Weighted readability: 9.4

Summary (111):
To block malware, phishing and other attacks, you need a device that can both "read" your network and "learns" whether the email that is coming in is safe, or whether it is the first wave of an attack.

Upgrading to a unified threat firewall can help protect your business networks from malware and attacks that traditional firewalls may miss.

Fig. 1

Dardenne was a teacher until she was called to serve as a regent of Missouri State University in Springfield.

Fig. 4a

| Noun Phrases |
|---|
| Dardenne |
| a teacher |
| she |
| a regent |
| Missouri State University |
| Springfield |

Fig. 4b

| Words | Contextual Entailment | Contextual Score | Prior Score | Total Score |
|---|---|---|---|---|
| teacher | tutor | -0.03474 | 0.0109 | 0.304 |
| teacher | teach | 0.2455 | 0.0107 | 0.4122 |
| teacher | staff | 0.07816 | 0.00984 | 0.3281 |
| call | consider | -0.0494 | 0.02243 | 0.5288 |
| call | appoint | 0.3985 | 0.001302 | 0.2855 |
| call | employ | 0.2595 | 0.002523 | 0.2543 |
| call | ask | 0.01635 | 0.007605 | 0.2587 |
| serve | represent | -0.1227 | 0.01738 | 0.3986 |
| serve | appoint | 0.07409 | 0.04715 | 1.073 |
| serve | use | -0.04535 | 0.02903 | 0.6624 |
| serve | sit | -0.1147 | 0.01281 | 0.3103 |
| serve | lay | -0.008147 | 0.006546 | 0.2277 |
| serve | aid | -0.02986 | 0.003536 | 0.1588 |
| serve | act | -0.04428 | 0.01237 | 0.3296 |
| regent | administrator | 0.02324 | 0.00325 | 1.022 |

Fig. 4c

| Entity | Confidence Score | Relevance Score | DBpedia Type | Freebase Type |
|---|---|---|---|---|
| Darelene | 0.5 | 0 | Person | /people/person |
| Missouri ({/m/04ych} (Q1581)) | 2.024 | 0.06658 | Place PopulatedPlace Region AdministrativeRegion | /meteorology/cyclone_affected_area /government/political_district /military/military_combatant /government/governmental_jurisdiction /location/us_state /law/court_jurisdiction_area /location/location /book/book_subject /symbols/flag_referent /business/employer /organization/organization_scope /symbols/name_source /location/administrative_division /military/military_unit_place_of_origin /location/dated_location /location/statistical_region /periodicals/newspaper_circulation_area |
| Missouri State University ({/m/019pwv} (Q1249251)) | 3.44 | 0.1498 | Place Agent Organisation EducationalInstitution University | /organization/endowed_organization /education/educational_institution_campus /education/educational_institution /award/ranked_item /award/award_winner /education/university /business/employer /location/location /organization/organization /film/film_screening_venue |
| Springfield | 0.5 | 0 | Place | /location/location |

Fig. 4d

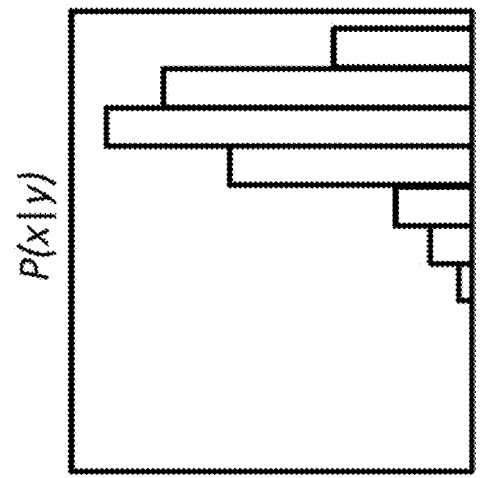
Fig. 5c
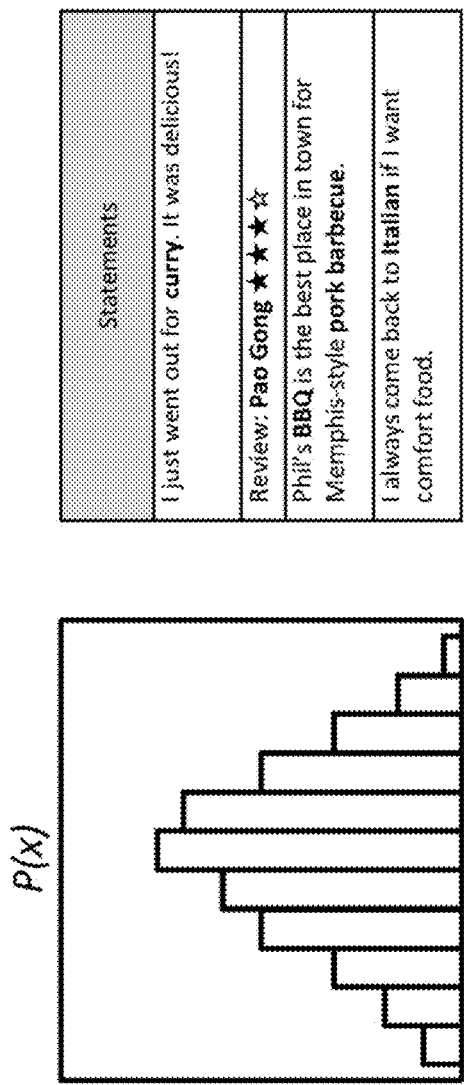
Fig. 5b
Fig. 5a
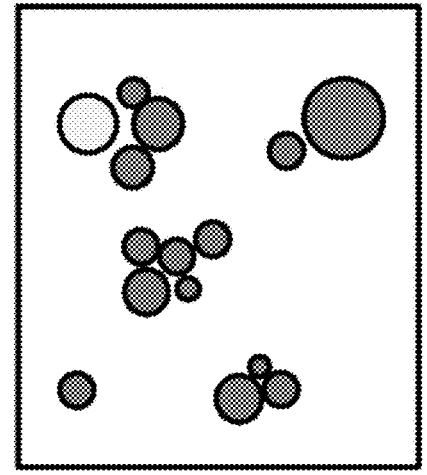
Fig. 5e
Fig. 5d

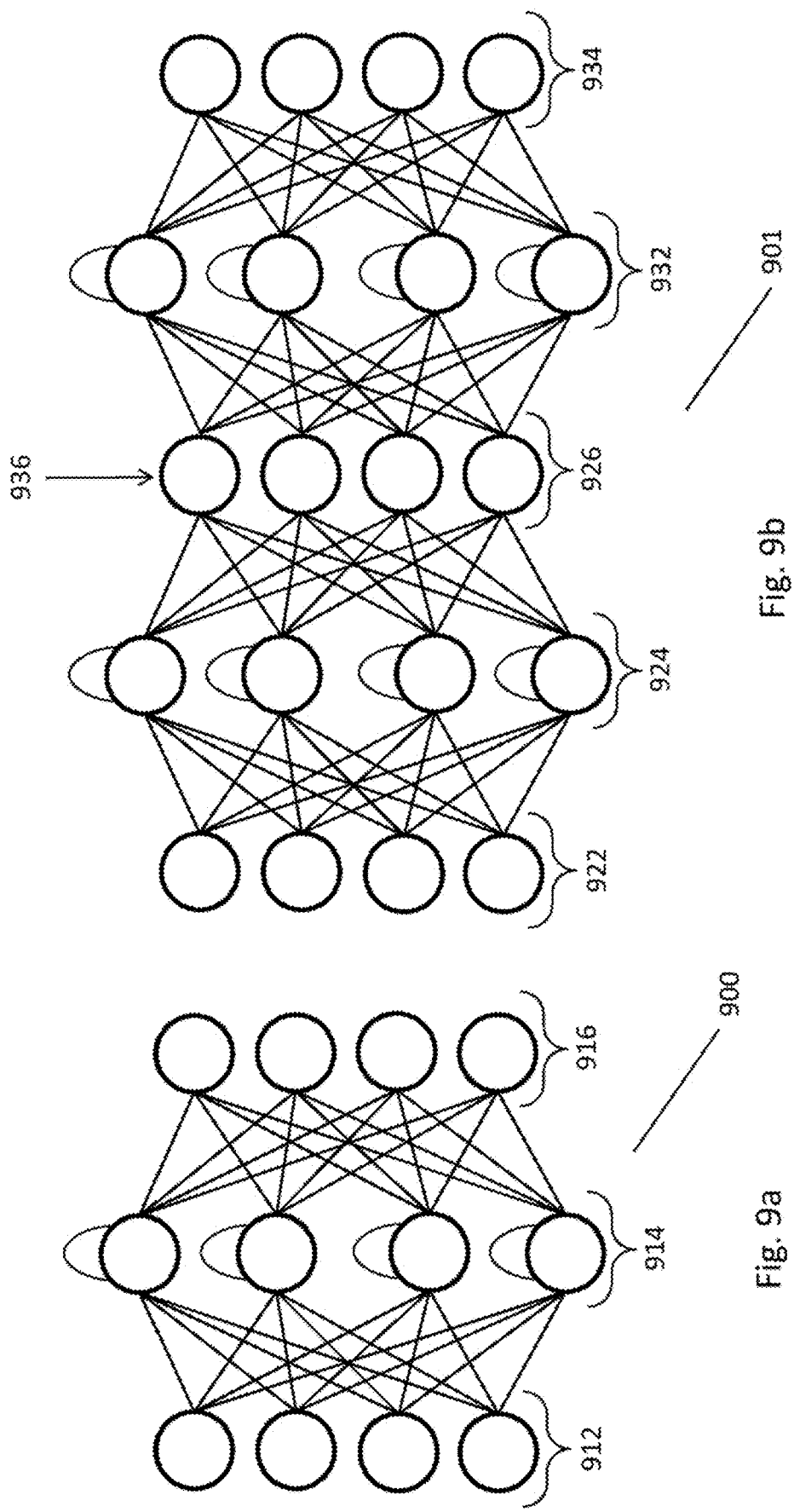

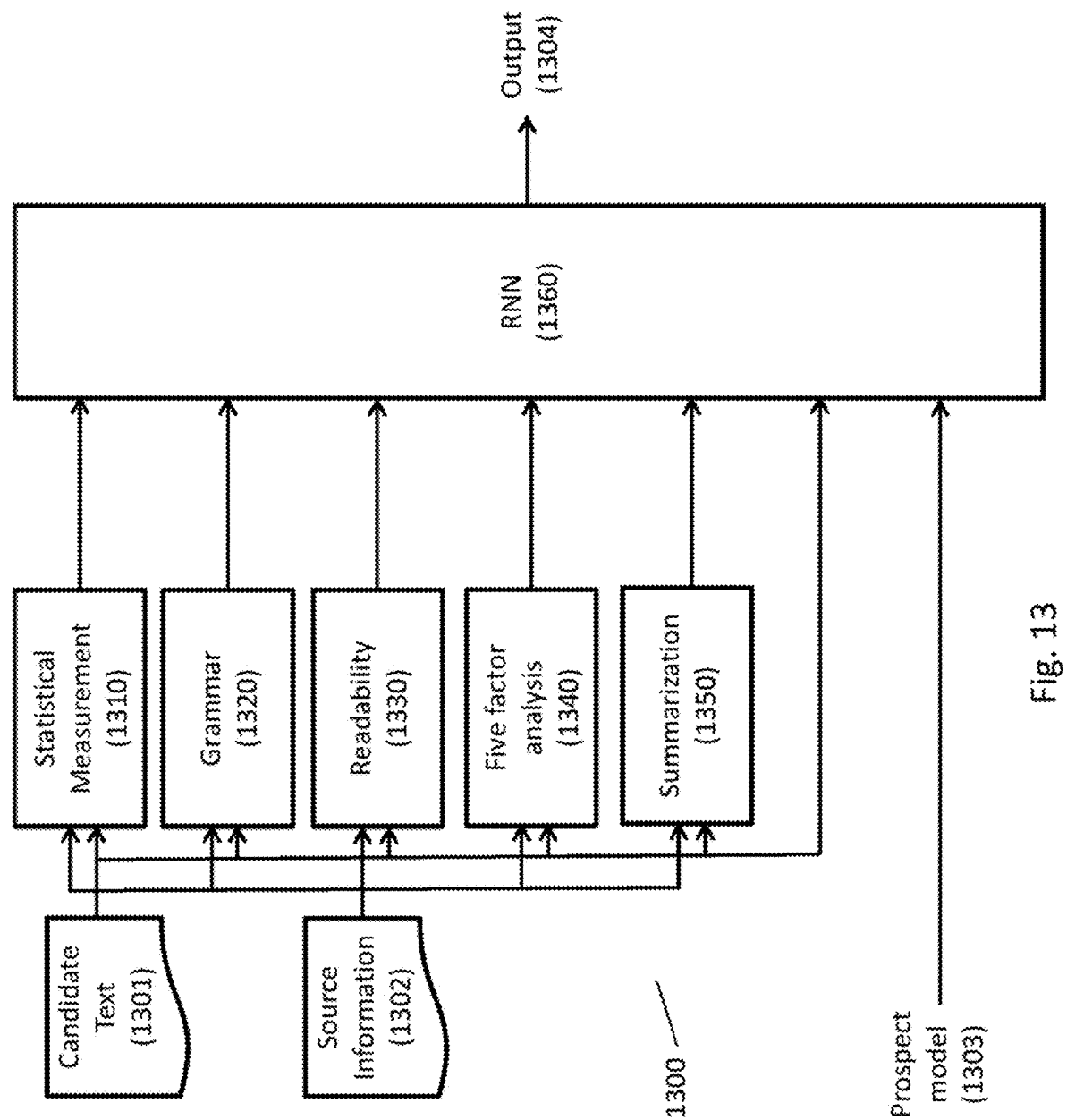

NATURAL LANGUAGE GENERATION USING PINNED TEXT AND MULTIPLE DISCRIMINATORS

CROSS-REFERENCE TO RELATED APPLICATION

The present application is a continuation of U.S. application Ser. No. 15/885,807, filed Jan. 31, 2018, and which is hereby incorporated by reference in its entirety as though fully set forth herein.

BACKGROUND OF THE INVENTION

Field of the Invention

This disclosure relates generally to the use of machine learning in the natural language processing space, specifically with regard to the generation of natural language in a restricted setting, with the generation being modified relative to measurements of deliverability and applicability based on an inferred model of personality and behavior.

Background Art

"Machine learning" is a term that encompasses a number of related but distinct techniques. These various techniques can be thought of as ways to map a complex set of inputs onto a set of outcomes through the creation of a (typically) differentiable manifold describing the correspondence between the input and output spaces. This manifold is typically referred to as the "model" for a particular problem. A number of different techniques are used to create models: rule-based methods, probabilistic methods, and various types of neural-network based methods, including Convolutional Neural Networks (CNNs), Recurrent Neural Networks (RNNs), Long Short-Term Memories (LSTMs), and similar. These neural-network based model creation methods are currently the subject of active study because of their ability to create "good" models that successfully deal with high-dimensionality inputs and outputs that would otherwise be intractable for human evaluation.

The quality or correctness of a model is captured relative to how well it performs on a particular task. Classification tasks map inputs to one or more classes of outputs based upon their features. Spam filtering is an example of classification, where the inputs are email messages and the classes are "spam" and "not spam". Clustering is a related task, where a set of inputs is divided into groups, where the group definitions are learned in the process of making the model. Regression tasks identify the relationship between variables, and density estimation finds the distribution of inputs in a particular space.

One aspect of a model is that as a mapping of many-valued inputs to many-valued outputs, it is not limited to discrimination between existing inputs, but can be used to predict the mapping of a new, never-before seen input to the set of outputs given the model. In this sense, the model has "learned" from a set of past experiences to associate a particular new input with its correct output. For some important problems, this "correct" output cannot be fully anticipated, except as a distribution of possible correct outcomes. In this case, the model maps multi-dimensional inputs onto a distribution of possible outputs, and the "correct" model is the one that minimizes the error between the distribution of the generated, expected outputs and the distribution of the observed set of outputs.

A current area of active research in machine learning is the automatic generation of realistic text given a set of predefined semantics. Generation and manipulation of text is difficult, and a number of different models have been proposed for the generation of text, some with more success than others. Unconstrained generation of natural language maps a series of semantic or actual "seed" values to a changing distribution of output values, where the output is sampled from the output distribution and the maximum likelihood or softmax value is output. This approach has been used to generate text using both a character-level and word-level models. Evaluation of the layers in a corresponding deep neural net shows that different layers of the net are sensitive to different-level features. A number of neural net architectures can be used to capture both local and more widespread context, generating text that conforms to both style and grammar rules. Thus, while it is currently possible to generate short phrases and sentences that are natural enough to pass for "human," longer-form natural language generation is an unsolved problem. This is particularly true when broader concerns related to topic, pacing, and emotional affect are considered. Existing generative models generally fail create text that lacks a coherent "story" or motivating principle, making the text easily distinguishable from high-quality human-generated text.

One approach to the generation of realistic data is using a Generative Adversarial Network (GAN). A GAN uses two paired networks that have opposite objectives: a discriminator attempts to identify "real" versus "fake" input, whereas the generator attempts to create fake inputs that can fool the discriminator. By pairing the two networks against each other, they simultaneously train each other to become more effective at both discrimination and generation. However, GANs are only defined for fully-differentiable, real-valued data, whereas text is discretely valued. The non-differentiability of text-output makes the backpropagation of gradients difficult. This can lead to discontinuities in the output or artifacts in the output associated with the use of continuous approximations.

A second approach is the use of a Variational Autoencoder (VAE). A VAE consists of paired encoder and generator networks which encode a text into to a latent representation and generate samples from the latent space, respectively. As the true underlying distribution of the latent space is not ascertainable, the model is trained by maximizing a variational lower bound on the log-likelihood under the model, using the KL divergence loss as a guide to optimization.

A third model operates on the level of characters, not words, treating the text as a low-dimensional stream of activations of particular character signals. Recurrent neural networks (RNNs) are typically used to maintain underlying state so as to create larger-level structures such as sentences and paragraphs, but character-level generation based on RNNs has so far been limited in its ability to provide coherency even when it successfully mimics the structures of the language.

BRIEF SUMMARY OF THE INVENTION

The disclosure below relates to generating plausible and provocative texts based upon the latent representation of similar texts. A personality and sentiment model is created for a target individual or class of individuals and the personality model is used as an input to a text generation system. Variation between texts is modified based upon the emotional effect that the generated text has as measured by the personality model. Certain words or phrases that are important to the subject matter are required in the output, reducing the variability and enhancing the likelihood of successful near-human-level text generation, and a number of tests (such as tests for grammar and reading level, a summarizer for information content, and a sentiment analyzer) provide input to a discriminator network so that proposed outputs match an outside objective regarding the information content, emotional affect, and grammatical acceptability. A feedback loop is also incorporated, allowing for learning to occur both with regard to the personality model and the generated text.

BRIEF DESCRIPTION OF THE DRAWINGS

FIG. 1 shows a model text that will be used to describe a number of different embodiments, together with various classifiers and their outputs sensitive to the textual content.

FIG. 4a shows the parse tree associated with a named entity recognition component according to one or more embodiments.

FIG. 4b shows the noun phrase detection associated with a named entity recognition component according to one or more embodiments.

FIG. 4c shows the word sense calculation associated with a named entity recognition component according to one or more embodiments.

FIG. 4d shows the named entity identification associated with a named entity recognition component according to one or more embodiments.

FIG. 5a shows a typical distribution of scores for one factor of the five-factor personality model across a population.

FIG. 5b shows a selected set of statements that have been made on the Internet or social media by a prospect.

FIG. 5c shows the change in the internal representation of a vector representing a prospect.

FIG. 5d shows a 2D projection of the vector space associated with the information associated with various prospects.

FIG. 5e shows a new distribution for a variable of interest given the information implied by a personality-based segmentation.

FIG. 9a shows a neural classification network according to one embodiment.

FIG. 9b shows a deep belief network according to one embodiment.

FIG. 13 shows implementation of an evaluator component according to one embodiment.

DETAILED DESCRIPTION OF THE INVENTION

Figure 2:
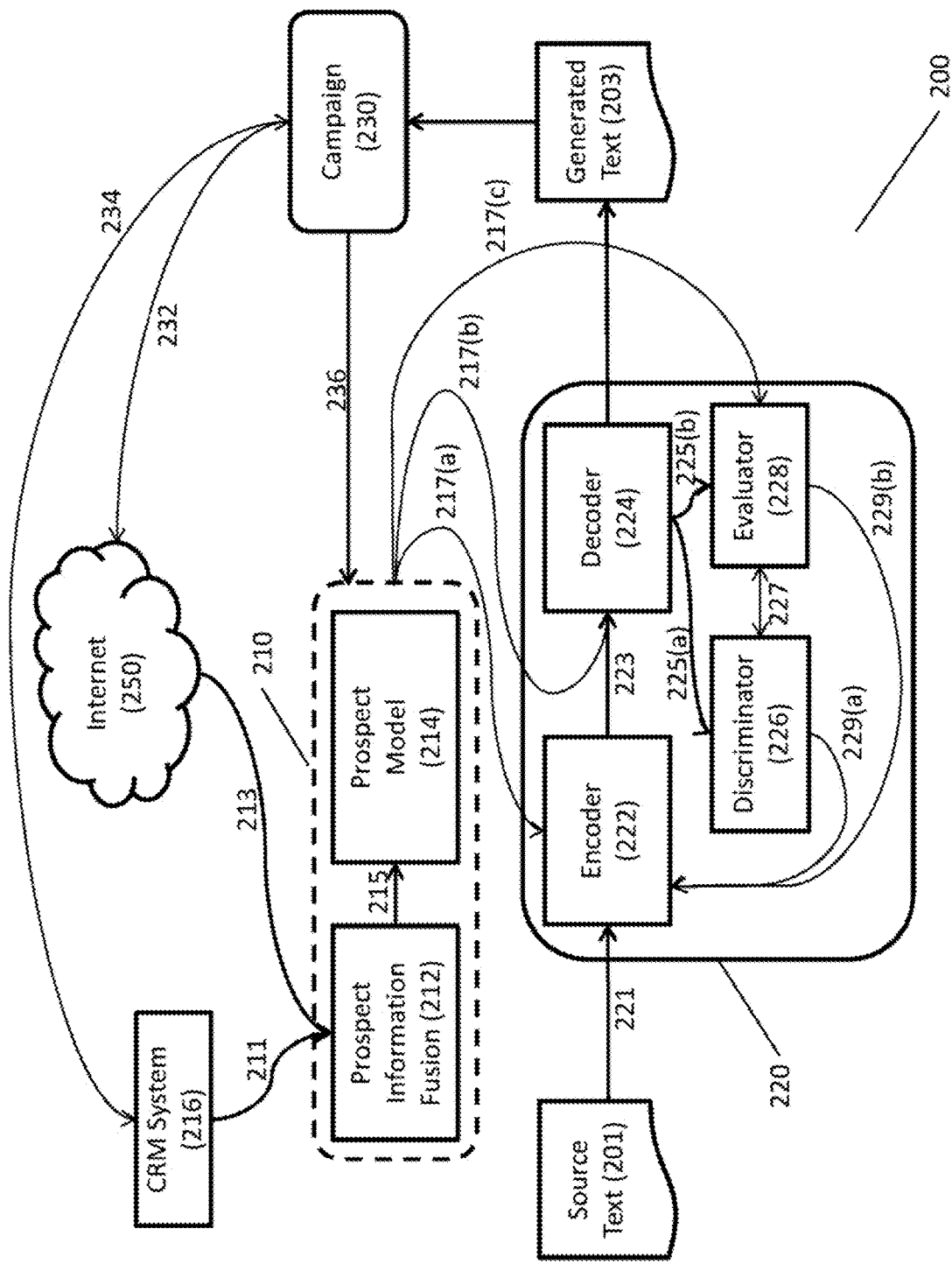
FIG. 2 shows a high-level diagram of the generative system according to one or more embodiments.

For clarity, a smaller number of representative embodiments will be described in detail as well as the functioning of different parts of the system. Regardless, a number of alternative embodiments of the described systems and methods are contemplated. As noted below, there are a variety of components that can be replaced, one with another, and then assembled into a system including one or more of the advantages described. Text generation will also be described in terms of a specific task—the generation of individualized marketing text—but the applicability of the systems and methods herein are not limited to that task and may be used across domains.

We will begin by defining a task including a number of constraints: the generation of marketing text. FIG. 1 shows a representative example of a marketing text with associated metadata. The initial text is shown at reference 101. Because this is designed to be a useful communication as opposed to just a set of plausible paragraphs, there are a number of associated constraints as well as target parameters. We will also identify a fictional target for the generated marketing text: a female owner of an educational accounting business in Springfield, Mo. This task and target are purely exemplary, and are used herein to identify and exemplify the use and functioning of the inventive system herein. In the context of the inventive system, however, these should be understood as data that is input into the system, not as part of the system itself. Other types of input data (different texts, or different targets) would result in a different output using the same system architecture described herein.

Reference numbers 103-111 show the output of various automated classifiers. The information associated with reference 103, "Statistics" shows the number of words, characters, and paragraphs, with the basic type of paragraphs identified. These statistical measures are important because various messages will have length and paragraph constraints. They might need to be longer or shorter to fit within a particular visual template or to be immediately ascertainable within an email message.

The information associated with reference number 105, "Personality," shows scores for the text based upon characteristic word and phrase usage as measured by the five-factor personality model initially described by Paul Costa and Robert McCrae (at the National Institutes of Health), and Warren Norman and Lews Goldberg (at the University of Michigan and the University of Oregon, respectively). The scores are scaled to the range $-1.0 \Rightarrow 1.0]$ to represent the presence of each trait or its opposing counterpart.

The information associated with reference number 107, "Grammar," shows spelling errors, grammatical errors and style suggestions. Minor issues with grammar (e.g., multiple spaces after a period in contravention of style rules) and style (e.g. suggested use of an Oxford comma) are shown to identify modifiable errors. These grammar errors are fixable by the application of concrete transformations to the text. Major grammar errors are not shown, as those would disqualify a text.

The information associated with reference number 109, "Readability," shows various standard automated readability measures, including measurements of education level needed to understand and respond to the sample text. The readability score of a text can be used to either broaden or narrow the expected receptive audience of a text by requiring a higher investment of education and time to read and understand the text. This can be useful in an advertising context for either extending reach or targeting more highly-educated readers.

The information associated with reference number 111, "Summary," shows an automated summarization of the text. This is useful for tracking the base information content associated with the text separately from its persuasive or explanatory content. Due to the nature of the task at hand, it is a goal to maintain approximately equal information content regardless of style.

In the context of various embodiments, the information and automated analysis associated with statistics 103, personality information 105, grammar 107, readability 109, and the summary 111 are used as a multivalued optimization target by the systems and according to the methods identified below. These classifiers can either be used as an acceptance classifier or a targeting classifier. Acceptance classifiers may be either binary classifiers (spelling correct/not correct, grammar correct/not correct) or Gaussian classifiers, with an acceptable range defined according to a characteristic distribution. In some embodiments, a secondary evaluation is performed in order to create a score. For example, the automated summary 111 can be classified according to a ROUGE score to make sure that the information content stays within an acceptable range, making sure that the subject matter of the generated text is maintained.

Targeting classifiers, such as the personality information 105, are typically Gaussian classifiers. In a number of embodiments, these can be multi-valued and will correspond to a field or target vector. The generated vector can be evaluated according to its geometric distance from a target vector (where a shorter distance is preferred) or it can be considered as a point in the probability space of potential responses (with higher-probability responses being preferred).

Within the context of the sample problem being discussed, FIG. 2 shows a high-level diagram of the generative system 200 according to one or more embodiments. The primary components of the system are the prospect modeling component 210 and the text generation component 220. Together with the campaign component 230, the entire system 200 can be can be considered as a specialized source-to-source translation engine for taking a source text 201 as an input 221 into the text generation component 220 and rendering a "translation" as generated text 203 that may or may not differ in output language but intentionally varies in sentiment and content according to a continuously-refined model of a possible reader as predicted by the prospect modeling component 210. The generated text 203 is used in a campaign 230 where targeted readers interact with the text (shown as two-way arrow 232) and respond, either implicitly approving or disapproving the generated text 203. The response of the targeted reader is reported back to the CRM system 216 (shown as arrow 234) and prospect modeling component 210 (shown as arrow 236) where the response is used to update the model of the prospect for use in the next evaluation, creating a feedback loop allowing for the updating of the prospect model 214 as well as a higher-quality future "translation" of the source text 201 into an effective generated text 203.

Focusing on the text generation component 220, it includes both an encoder 222 and a decoder 224. The encoder 222 encodes the words within the source text 201 as a list of vectors, where each vector represents the contextual meaning of the words within the text, including in the context of their position within the statement and paragraph, encoding the latent distribution in one or more hidden layers at 223. The encoder also takes as input information associated with the prospect model, shown as arrow 217. Once each sentence in the source text 201 is read, the decoder 224 begins, generating a series of equivalent sentences by sampling from the latent distribution implied by the source text. To generate the translated word at each step, the decoder pays attention to a weighted distribution over the encoded word and sentence vectors judged most relevant to generate the English word most appropriate for the particular place in the sentence.

In various embodiments, the text generation component also includes a discriminator 226 and an evaluator 228. The discriminator 226 is used to judge whether a particular candidate output is "human-like," without primary regard to the content of the candidate output. The output of the discriminator is provided back to the encoder 222 at 229(a). The evaluator 228 is used to judge whether the generated text conforms to the target classifiers identified relative to FIG. 1. The output of the evaluator can be used both to disqualify a particular candidate text (for failing one or more binary classifiers or for falling too far outside an acceptable range on a Gaussian classifier) but it can also be used as part of a feedback loop for the encoder 222, shown as arrow 229(b), but also as an input to the discriminator 226, shown as arrow 227.

The arrow 227 is bidirectional, showing that a "human-like" candidate text provided by decoder 224 can be evaluated before that text is provided to the evaluator 228, in parallel with the evaluator 228, or after the evaluator 228 has provided a score indicating the appropriateness of the candidate text. The ordering of the information flow between the discriminator 226 and evaluator 228 is contingent both upon the desired intuitive model as well as the underlying hardware available and whether parallel application is reasonable. If the discriminator 226 is first in time, then its score as to the "humanness" of the generated text is used as an input to the evaluator 228. The intuition for this model is that a more human-like input should also score better relative to the target messaging, sentiment values, and information content measured by the evaluator 228. If the evaluator 228 is first in time, then its output can be used as an input to the discriminator 226. The intuition for this model is that a generated text that appropriately replicates a particular paragraph with appropriate length, spelling, and grammar, but with different words and emotional tone will also end up scoring better (more "human-like") by discriminator 226. In at least one embodiment, the discriminator 226 and evaluator 228 are parallel inputs into a single component that evaluates both elements simultaneously, and the arrow 227 is representative of the connection between different layers of the joint discriminator/evaluator component.

Focusing on the prospect modeling component 210, it consists of two major subsystems, the prospect information fusion component 212 and the prospect modeling component 214. The prospect information fusion component is also connected to a system storing information about various prospects, labeled CRM System 216. The flow of information from the CRM system 216 to the prospect information fusion component 212 is shown as arrow 211. The prospect information fusion system 212 is also connected to the Internet 250, where it can retrieve information from external sites or services, such as Google, Facebook, Instagram, etc., from data enrichment services, and from prospect websites, online fora, and email communication. The retrieval of this information from the various sources' is shown as arrow 218. The distinction between the information from CRM system 216 (shown by arrow 211) and the information from the Internet 250 (shown by arrow 213) is that the information from CRM system 216 may be proprietary, related to previous interactions between the organization using the system 200 and a prospect, or based upon prior proprietary research regarding the prospect that has been preprocessed and/or stored locally. Although the bootstrapping and training of the system is described here, it is anticipated that ongoing information and results will be reintroduced to the system as new data, providing an ongoing learning loop.

The prospect information fusion component 212 collates the available information from both CRM system 216 and the Internet 250 into a representation of known or supposed facts about a particular candidate. In one embodiment, each fact is also accompanied by a representation of the confidence that the system has in each separate fact. Inconsistent information is either reconciled, reduced in confidence, or discarded from the assemblage of facts representing a particular person. As information is supported by multiple sources (either from CRM System 216 or multiple entities on the Internet 250), is confirmed as correct or highly predictive through interactions associated with campaign apparatus 230, or is verified outside system 200 and input into CRM system 216, the factual representation of each prospect is brought together so that the resulting facts are consistent with a particular prospect. The correlated facts associated with the prospect, together with any associated confidence values, are the "factual model" of the prospect that is provided to the prospect modeling component 214, as represented by the arrow 215.

The prospect modeling component 214 takes the factual model provided by the prospect information fusion component 212 and creates a second model—a model of the prospect's personality, interests, and receptiveness to particular types of appeals. For example, some prospects may respond better to a logical appeal, whereas other prospects may be more receptive to an emotional appeal. This is not limited to "logical" or "emotional" appeals. The prospect model can be thought of as a mapping of the latent persuasive landscape associated with interest and persuasion onto a set of visible markers representative of a particular prospect's real-world circumstances. This representation of the prospect's receptiveness is encoded into a matrix which is provided to encoder 222, decoder 224, and evaluator 228, for use in creating the latent document space, for guiding the sampling from the latent document space, and for evaluating the output to see whether it matches the predicted model according to the personality classifier 105.

The remaining high-level component is the campaign component 230. For purposes of the embodiments described herein, this can be the use of the generated text 203 in a web page, in a directed email, in an advertisement, in direct mail, or in any other fashion that induces the prospect to interact with the generated text. From the system 200's perspective, the campaign 230 is a testing procedure by which the appropriateness and correctness of the entire system is judged. Each interaction—negative or positive—is harvested as feedback to the system as shown by arrow 236. In one embodiment, the campaign 230 is a targeted email campaign. The email campaign has a number of concrete interactions with external systems that are used as feedback into the system. For example: Was the email rejected by an automated spam filter? Was the email seen by the prospect? Was the email opened by the prospect? Did the prospect engage with any content or links in the email? And finally, was a sale or connection made as a result of the email? Each one of these factual circumstances is used as a training point for the system 200 as a whole.

Within the context of the high-level system described in FIG. 2, each major subsystem and its associated functioning will now be described.

Figure 3:
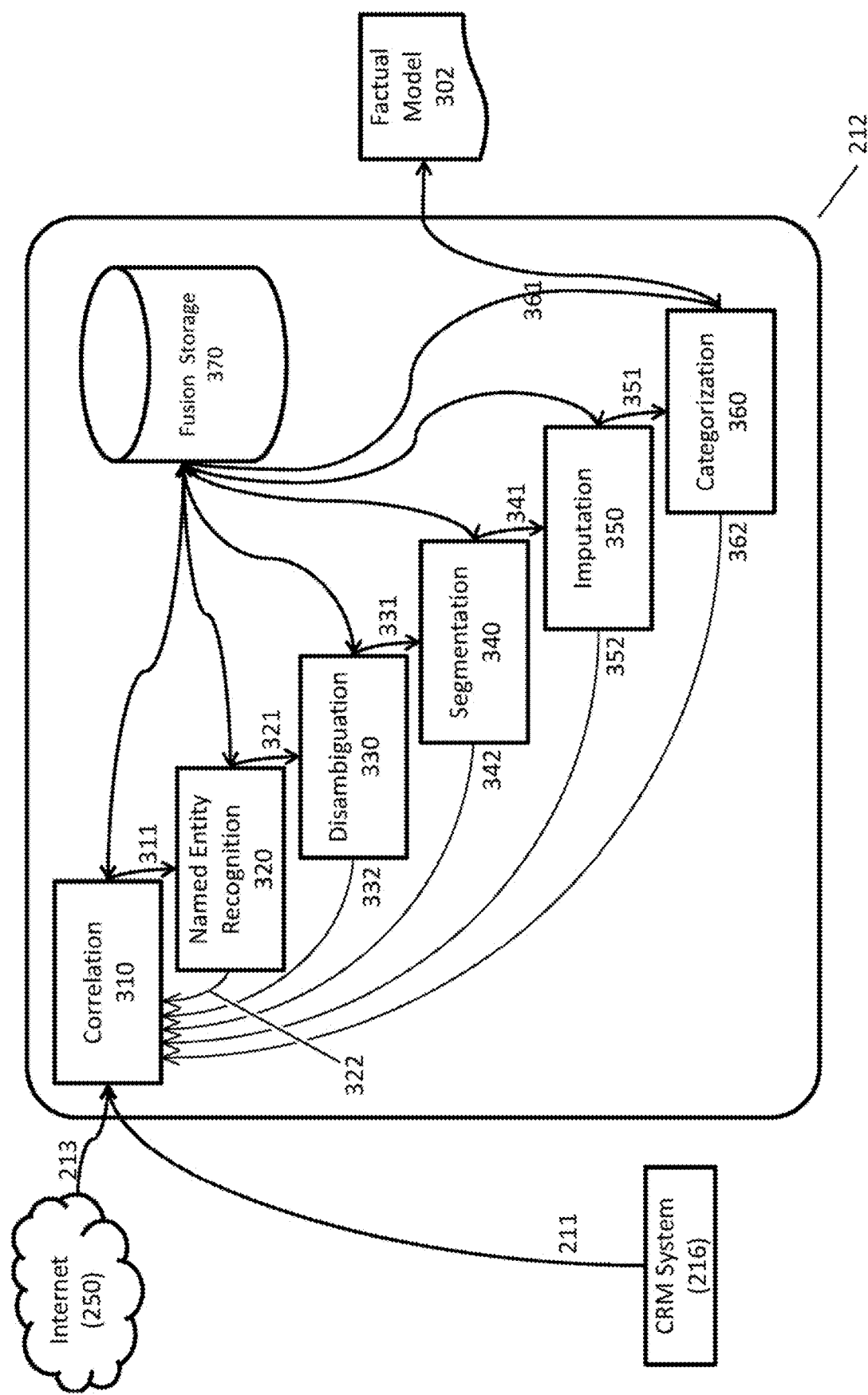
FIG. 3 shows the structural components of the prospect information fusion component according to one or more embodiments.

FIG. 3 shows a component view of the prospect information fusion component 212. The prospect information fusion component 212 is a system that takes uncorrelated information from a CRM system 216 and the Internet 250 and creates an output factual model 302 that has correlated factual data with an associated confidence. This is usually referred to in the industry as "data enrichment."

Data enrichment is performed in the prospect information fusion component by a linked chain of a number of distinct subcomponents—the correlation component 310, the data entity recognition component 320, the disambiguation component 330, the segmentation component 340, the imputation component 350 and the categorization component 360. There is also a fusion storage component 370, accessible by each of the other components and operable to store or retrieve data. As is shown by the internal control and information flow links 311, 321, 331, 342, and 351, as well as the backwards control and $$D' = \Sigma_{k=0}^{n} D_k \cdot f_k + (D) \quad \text{(Eq. 1)}$$

flow links 322, 332, 342, 352, and 362, the mathematical model of data enrichment is primarily iterative:
where $D_0$ represents data as originally received, $D_n$ represents data with one or more of the functions 1 . . . n applied, and $D'$ represents the final fused/enriched data.

The prospect information fusion component and each of its subcomponents will need to deal with both objective and subjective data. In the context of fusion component 212, objective data is data that has a knowable true value. This data usually corresponds to facts in the world, such as names, addresses, profession, demographic data, etc. Subjective data refers to data where information about the true value can be inferred, but the actual distribution of values is unknowable or too complex. For example, this data can refer to sentiment or personality information that is not directly observable, but which can be inferred from background, context, word choice, etc. An example of the processing of each of these types of data by each subcomponent 310-360 will be described.

Correlation component 310 integrates multiple data representing the same real-world object or concept into a canonical representation that has a known value inside the system. This can refer both to the correlation of raw data as well as the correlation of higher-level information constructs. For each piece of information that is to be correlated, there are three steps: recognition of a correlatable data representation, conversion of the data representation into a canonical form, and linking of all representations of the same underlying data to the canonical form. An example of an objective data point that is correlated is location. Location can be represented in a number of ways: a street address ("123 South Market Ave, Springfield, Mo."), as a postal code ("65806"), a geographic latitude and longitude ("37° 12'16.0"N 93° 17'39.2"W") or sometimes as an MSA. From a data representation perspective, each one of the above may be represented within a data processing system as an integer, float, or string, or as some kind of higher-level struct or tuple. In one embodiment, a canonical representation, including both the data type and an associated interpretation is chosen for each objective data element provided to the correlation component 310. Sometimes received information is labeled in such a way as to make it clear that it refers to a particular correlatable piece of objective data, such as labeling a data field with the string "street address." Other times, the format of the data can be recognized (such as a set of words that could be a city name, followed by a known state code, followed by a five or nine-digit group of integers). This can be recognized by a state machine, NFA, or DFA, as represented by a regular expression or similar, or by a neural network trained on similar data to recognize particular inputs. In this example, we will assume that the data is labeled "street address." The correlation component 310 converts the received representation, such as the string "123 South Market Ave, Springfield, Mo." into a latitude and longitude pair, stored as a tuple of tuple of integers ((37,12, 16,0,0), (93,17,39,2,3)). This becomes the canonical representation for location data within the system. All the other types of data that are recognized as location data are converted to this canonical form and thus can be compared for equality or distance. The canonical form can also be used to express a range. For example, the use of NaN or nulls in some of the lower-order integer places can represent "anywhere in the larger division identified by the higher-order location information." In this example, all the information described above all represent the same physical location in the real world, so in each case the information is stored under a common representation in the storage component 370, thus allowing the different representations above to refer to the single canonical representation and thus all be correlated together. This process of recognizing, converting, and linking can be repeated for any type of objective data. For almost any type of standardized data that will be exchanged, there are applicable standard forms—time data, profession codes for types of employment, health care provider codes for types of health procedures or conditions, etc. In each case, a preferred embodiment uses standardized formats for internal representation of objective data whenever possible so as to make the recognition of correlatable data easier and reduce the amount of conversion necessary to go from external formats received via inputs 211 or 213 to the internal, canonical format. For subjective data, the process of correlation is almost identical, except that the canonical form of the data is arbitrary and does not necessarily have any connection to other representations that may exist outside of the system. For example, there is no standard representation of a manifold representing inferred personality information, and there is no observable "true" value for "agreeableness." Using personality information as a subjective data point, a clinical model such as the Meyers-Briggs Type Indicator (MBTI) or the Five-Factor personality model can be—and in a preferred embodiment is—represented by a vector of numbers associated with the inferred strength of various aspects of a prospect's personality, and the multi-dimensional vector space can be the canonical representation stored inside the storage component 370.

It is anticipated that in many cases, not all of the information that is possibly correlatable will be identified and correlated during the initial pass of the correlation component 310. It is not necessary for the correlation component to identify and correlate each possible value. Instead, processing continues to the next component such that the raw data, including as many correlated values as have been identified and correlated get passed to the named entity recognition component 320 along flow 311.

The named entity recognition component 320 uses text structure and context to identify correlatable values. The named entity recognition component 320 labels sequences of words from a text, identifying them from grammar and context rules as names of people, companies, organizations, cities and other types of entities. Features are extracted using natural language processing techniques, including colocations, part-of-speech tags, neighbor entity labels, and substrings. Similarly to the discussion relative to the correlation component 310 above, there are a number of entities that can be identified and thus correlated according to their rigid designators. Rigid designators typically include proper names, brands, names of natural materials, and may include temporal and numerical expressions as well. In the context of the named entity recognition component, it is also possible to have local designators that are used to consistently refer to an entity even if the local designator is not a rigid designator in linguistic theory. A number of named entity recognition systems are known in the art operating according to different theories of operation, including linguistic grammar-based techniques and statistical models, such as those based on conditional random fields. These include SpaCy, GATE, OpenNLP, the Stanford Named Entity Recognizer, SEMAFOR, Baleen, Cogcomp-NER, and others. Wikipedia, Freebase, or DBpedia can also be used as parts of a named entity recognition system by identifying key terms that are linked to particular explanatory pages.

As it is expected that much of the data received from the Internet 250 will be in the form of free text, FIGS. 4a-4d show the operation of the Named Entity Recognition component 320 according to one embodiment. Information in the form of text is received from the Internet 250 and is passed (through intermediaries as necessary) to the named entity recognition component 320 according to arrow 213. In this embodiment, the named entity recognition component receives each sentence or group of sentences and uses a processor to tag the words according to the part of speech (4a) and identify particular noun phrases (4b) within the input. Words that contribute highly to the meaning of the phrase are identified according to their word senses (4c), with the highest word senses contributing the most to the evaluation of the sentence. The noun phrases and key terms, according to the highest ranking senses, are then identified relative to possible rigid or local identifiers (4d). At this point, any new information not included in the storage 370 is identified, and flow returns to the correlation component 310 so that any information newly identifiable via a canonical representation can be associated with the prospect and stored, thus increasing the amount of correlated information. Alternatively, both the original information as well as a simplified version where known correlated entities have been substituted in for possibly-ambiguous references can be passed forward to the disambiguation component 330, as shown by arrow 321.

Even when named entity recognition is completely successful, natural language is ambiguous enough that there can be more than one "correct" reference associated with a particular entity. There can also be variations and ambiguity in entity names, where more than one identifier may apply. Returning to FIG. 3, the disambiguation component 330 is used to classify information. In one embodiment, disambiguation component 330 performs Bayesian inference using the marginal likelihood of two different models correctly predicting the associated data:

$$P(D \mid M) = \prod_{i=1}^{n} \prod_{j=1}^{q_i} \frac{\Gamma(N'_{ij})}{\Gamma(N'_{ij} + N_{ij})} \prod_{k=1}^{r_i} \frac{\Gamma(N'_{ijk} + N_{ijk})}{\Gamma(N'_{ijk})} \qquad \text{(Eq. 2)}$$

The input of a disambiguation component 330 is a set of ambiguous entities. For each ambiguous entity, it is given a set of candidate entities. Then, the features are used to train the classifier, which learns to disambiguate entities in the text. In one embodiment, this is done as a form of supervised learning, where known information (or information that has a high-enough likelihood of being correct) is used to inform the probabilities of each particular assertion ascertainable within the text. The sum of the posterior probabilities accounting for each prior can then be calculated using equation 2. In an alternate embodiment where this is done via a classifying neural network, the correct information is distributed through the network by means of dynamic routing or backpropagation. After training, unknown information is entered into the disambiguation component 330 and the result is output. The highest-likelihood entities, considered as a whole, are then identified and the lower likelihood entities are trimmed. Flow returns to the correlation component 310 via arrow 332 so that any information newly identifiable via a canonical representation can be associated with the prospect and stored, thus increasing the amount of correlated information. Alternatively, the original information and the highest-likelihood correlated entities are passed forward to the segmentation component 340, as shown by arrow 331.

Segmentation component 340 groups data according to a set of characteristics. In some embodiments these can be predefined. In other embodiments they may be discovered. In the context of the example task being described, there are user characteristics that will allow otherwise ambiguous content to be interpreted with higher confidence. For example, if the prospect refers to "the University," this is ambiguous without greater context. However, grouping information according to geography would indicate geographic proximity to the University of Missouri. A tweet (retrieved from the Internet 250) that refers to "AR" may be interpreted better as "Accounts Receivable" instead of "Augmented Reality" when the prospect's background as a small business owner is taken into account. Other characteristics such as social and economic demographic information may also be helpful. After segmentation, flow returns to the correlation component 310 via arrow 342 so that any information newly identifiable via a canonical representation can be associated with the prospect and stored, thus increasing the amount of correlated information. Alternatively, the original information and the highest-likelihood correlated entities are passed forward to the imputation component 350, as shown by arrow 341.

Imputation component 350 estimates values for missing or inconsistent data. Missing data can introduce bias or affect the representativeness of the results. Imputation replaces missing data with probable values based on other available information. When missing information has been imputed, the data set can then be analyzed using standard techniques for complete data. In contrast to the segmentation component 340 that identifies and amplifies existing data, the imputation component 350 stores estimations in place of unknown or unknowable data. According to one embodiment, the imputation component 350 has two separate methods of operation: either individualized estimation or group estimation. Individualized estimation is performed by identifying information relevant to an unknown quantity of interest, and a value is imputed based upon the known correlated information. Group estimation is performed by associating the prospect with one or more groups containing the prospect, and using the group estimation as a proxy for individual information.

In simple cases the imputation component can simply use the most common value from a particular distribution of values, perhaps modified by a Bayesian prior. However, more involved methods of imputation can also be used. FIGS. 5a-5e show one embodiment of a process used by imputation component 350. FIG. 5a shows a typical distribution of scores for one factor of the five-factor personality model across a population. For purposes of illustration, assume the plotted factor represents "openness to experience." FIG. 5b shows a selected set of statements that have been made on the Internet or social media by the prospect. Each of these statements expresses interest in a different type of food. The vectors (a)-(d) in FIG. 5c show the change in the internal representation of a vector representing the prospect. In one embodiment, statements in 5b are transformed into a bag of words representation and stopwords removed. The vectors (a)-(d) show a portion of the vector where each element of the vector represents a different word. As each piece of information is identified, the corresponding word is changed from a 0 to a 1. In one embodiment, more than words are represented by the positions in the vector; they can also be concepts or entities. For example, the term "Pao Gong" in FIG. 5b can be associated with a particular Chinese restaurant, and so the concept of "enjoys Chinese food" can be represented within the vector representation of 5c. As more information is discovered about the prospect, more concepts or words can be associated with the prospect. FIG. 5c shows this by showing the change in a portion of the vector representation over time from earlier (vector (a) at top) to later (vector (d) at bottom). FIG. 5d is a 2D projection of the vector space associated with the information associated with various prospects. As can be seen in the figure, some of these points are much closer to others in the space represented by the information. The grouping associated with the particular prospect is represented in a lighter color. A number of different groupings are possible, including both the very close analogues (within the same "bubble" in FIG. 5d) or within larger groupings (the group of close "bubbles" in FIG. 5d). In one embodiment, this is measured as the cosine of the angle between the two vectors. Other distance measurements, such as Manhattan distance in a Euclidian space, the Wasserstein distance, or a measure of distance in a non-Euclidian (such as hyperbolic) space. A third embodiment uses a dimensionality reduction procedure such as T-SNE. The different groups are thus identified (the population is "segmented"). FIG. 5e shows a new distribution for the variable of interest given the information implied by the segmentation, P(x|y). If there is enough confidence in the new predicted information given the updated prior, then then the value for x (the variable of interest) can be recorded in the storage 370. In an alternate embodiment, the value for x as well as the strength of the confidence in x are both recorded in the storage 370. As with the other components, this new information can then be correlated with existing information and/or used to infer new information about the prospect. In various embodiments, other techniques such as latent semantic indexing (LSI), latent Dirichlet allocation (LDA), and/or probabilistic models. Other embodiments may use a neural network-based discriminator. After imputation, flow returns to the correlation component 310 via arrow 342 so that any information newly identifiable via a canonical representation can be associated with the prospect and stored, thus increasing the amount of correlated information. Alternatively, the original information and the highest-likelihood correlated entities are passed forward to the categorization component 360, as shown by arrow 351.

Categorization component 360 labels data or groups of data according to different categories, usually relating to either topical or sentiment information. Topic identification allows a broader understanding of a prospect by allowing the grouping of multiple actions or statements into a coherent set of references to a common topic—which topic may itself be able to be correlated with other statements. Sentiment analysis allows the detection of presumed emotional signals—or at least emotional tenor—from the actions or statements of the prospect. For example, it helps more to know if person is a) discussing a political party and b) has a strong positive sentiment than simply to know that the political party is being discussed.

Figure 6:
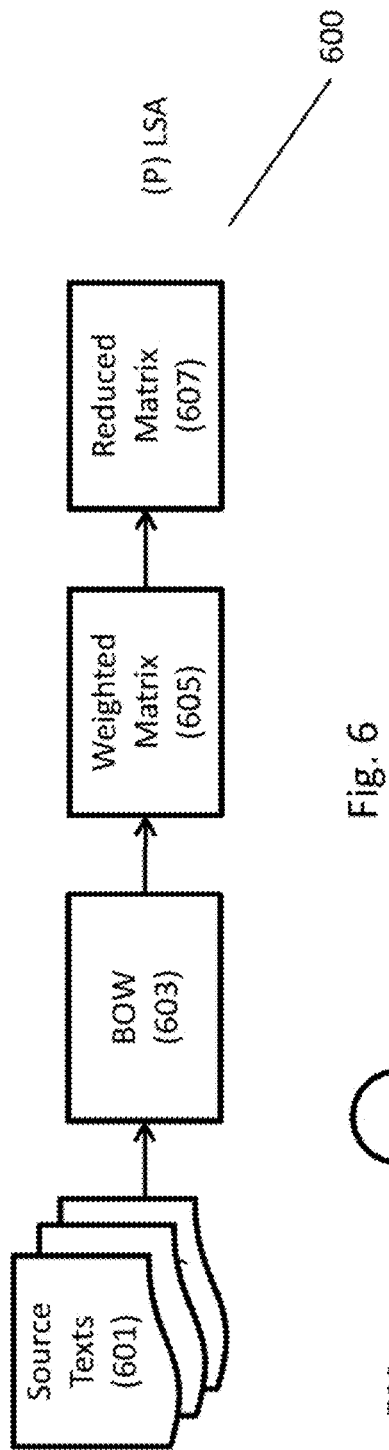
FIG. 6 shows a process by which a series of signals can be condensed into topics.

In one embodiment, topic identification is performed using a latent semantic analysis (LSA) technique or a Latent Dirichlet Analysis (LDA) technique. FIG. 6 shows a process 600 by which a series of signals can be condensed into topics. The set of initial input documents 601 includes a set of signals, in this case words retrieved from an Internet source. Each document (or other signal source) is processed and converted into a term-document matrix. In one embodiment, this is done by converting the words into a vector using the "Bag of Words" technique, using one dimension per word as discussed relative to FIG. 5c. Each document is a row in the matrix 603 (although the row/column relationship can be flipped for some applications). The relative importance of various words—or signals—in the matrix can then be boosted to create the weighted matrix 605. One technique is to use the term frequency divided by the inverse document frequency. Other types of weighing are also contemplated such as log weighting, augnorm weighing, GF/IDF boosting, and entropy boosting. The use of a multinomial Poisson distribution can also be used to convert the LSA to probabilistic LSA. At that point a Singular Value Decomposition (SVD) is used to create rank-reduced matrix 607. A is the supplied m by n weighted matrix 605. T is a computed m by r matrix of term vectors where r is the rank of A≤min(m,n). S is a computed r by r diagonal matrix of decreasing singular values, and D is a computed n by r matrix of document vectors:

$$A \approx A_k = T_k S_k D_k^T \qquad \text{(Eq. 3)}$$

The rank is reduced by keeping only the largest k«r diagonal entries in S, with k chosen in the range from 50-500. The computed $T_k$ and $D_k$ matrices define the term and document vector spaces, which with the computed singular values, $S_k$, embody the conceptual information derived from source documents 601. Given matrix 607, the words, phrases, or concepts that are most representative of a particular area in the reduced vector space can be used as topics. In conjunction with the correlation techniques described relative to components 310-350, this allows the consolidation of related information under a topic. In one embodiment, similar words, phrases, and concepts can be connected into a graph, with the connectedness of concepts serving as weights for arcs between the concept/word nodes. Thresholding can be used to remove low-valued connections. Community-detection algorithms, such as infograph, can then be used to further group concepts . . . .

Another embodiment uses LDA. LDA starts from the assumption that the words or signals used in a particular source—again, using the example of a document retrieved from the Internet—has a relationship to a distribution of topics across a field. Topics are identified based on the likelihood of term co-occurrence according to the probability as follows:

$$P(W, Z, \theta, \varphi; \alpha, \beta) = \prod_{i=1}^{K} P(\varphi_i; \beta) \prod_{j=1}^{M} P(\theta_j; \alpha) \prod_{t=1}^{N} P(Z_{j,t} \mid \theta_j) P(W_{j,t} \mid \varphi_{z_{j,t}}). \qquad \text{(Eq. 4)}$$

where K is the number of topics, V is the number of items in the vocabulary (assuming words as signals), M is the number of distinct documents, $N_d$ is the number of words in each document (and N across all documents), α is the prior weight of a topic in the distribution, β is the prior weight of a word in a topic distribution, φ is the probability distribution of topics, and Θ is the probability of a topic occurring in a document.

Figure 7:
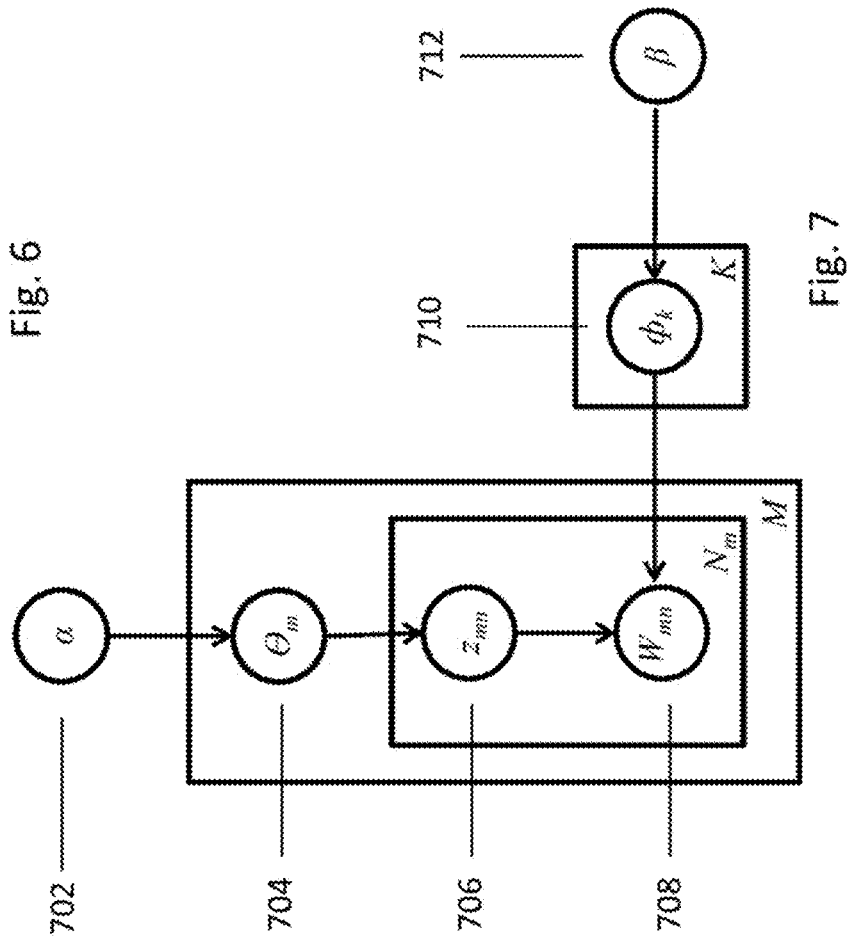
FIG. 7 shows a diagrammatic implementation of LDA according to one embodiment.

FIG. 7 shows a diagrammatic implementation of LDA according to one embodiment. Elements 702 and 712 are Dirichlet priors, with element 710 representing the topic. Element 704 is the document-specific Dirichlet distribution, whereas 706 represents topic assignment and 708 represents the observed word.

Sentiment analysis uses statistical analysis to associate a series of words or symbols with a reported emotional state. Because there is no true distribution, sentiment analysis usually uses a combination of supervised learning and multi-factor association to associate particular words and phrases with emotional responses. Reviews are a common data source for sentiment analysis because many reviews have both textual comments ("This product is of very high quality . . . .") and a numerical rating ("★★★★★"), allowing patterns of usage to apply. Word vectors (i.e. word2vec, Glove, Conceptnet Numberbatch) can be used to then expand the vocabulary outside the review space while maintaining the emotional association. In one embodiment, this functionality is provided by modeling the input signals as Bayesian priors for a positive/negative sentiment correlation.

Returning to FIG. 3, the output of all the components 310-360 is factual model 302. The factual model consists of a set of data and inferences, some labeled and some unlabeled, that have been generated by the iterative process described relative to components 310-360. Once the threshold of reasonable inference has been reached, e.g., no more inferences or correlations can be performed with estimated accuracy >75%, the factual model can be stored in the fusion storage 370. Absent updates to the model, future requests for data concerning the same prospect can be provided directly from the storage 370 without going through the multi-step correlation and inference process described herein. Future data updates can be introduced into the process and the prospect factual data model can be updated as described above. Confirmation of particular data elements (either by receiving a confirmatory signal from the prospect, by reaching a cumulative confidence threshold, or otherwise) can be stored as "known" data. Information that is called into doubt (e.g., "address" after a prospect moves) can be demoted from "known" status by reducing the confidence score associated with it. Note that the factual model need not be interpretable by humans; it is a composite machine model of the known "facts" in its world, the association of various facts with other facts in a vector space, and a projection of the estimated "facts" known about a prospect as a manifold on that space. Also included may be confirmed statements made by a prospect.

With the factual model, the next step is to create a personality model for the prospect that can be used to predict the effectiveness of different types of communications. While a number of different personality models can be used, the example embodiment shown will use the OCEAN or "Five Factor" model of personality. However, any model of personality that uses a multiple orthogonal dimensions along a scale to represent personality tendencies, such as the Big Seven, HEXACO, or Meyers-Briggs personality categorization methods will work equally well.

By way of background, the five factor model of personality is a widely-used statistical model of personality based upon common language descriptors of personality. The use of factor analysis on personality survey data shows that consistent words and concepts are used to describe similar traits across cultures. Five factor theory groups these responses into five separate measures that have two complementary expressions. These measures are: openness to experience, conscientiousness, extraversion, agreeableness, and neuroticism, often represented by the acronym OCEAN. Each major factor includes a number of correlated behaviors and preferences. For example, extraversion is related to gregariousness, assertiveness, excitement seeking, interpersonal warmth, and high activity. Wikipedia (https://en.wikipedia.org/wiki/Big Five_personality_traits) describes the personality traits as follows:

Openness to experience: (inventive/curious vs. consistent/cautious). Appreciation for art, emotion, adventure, unusual ideas, curiosity, and variety of experience. Openness reflects the degree of intellectual curiosity, creativity and a preference for novelty and variety a person has. It is also described as the extent to which a person is imaginative or independent and depicts a personal preference for a variety of activities over a strict routine. High openness can be perceived as unpredictability or lack of focus. Moreover, individuals with high openness are said to pursue self-actualization specifically by seeking out intense, euphoric experiences. Conversely, those with low openness seek to gain fulfillment through perseverance and are characterized as pragmatic and data-driven-sometimes even perceived to be dogmatic and closed-minded. Some disagreement remains about how to interpret and contextualize the openness factor.

Conscientiousness: (efficient/organized vs. easy-going/careless). A tendency to be organized and dependable, show self-discipline, act dutifully, aim for achievement, and prefer planned rather than spontaneous behavior. High conscientiousness is often perceived as stubbornness and obsession. Low conscientiousness is associated with flexibility and spontaneity, but can also appear as sloppiness and lack of reliability.

Extraversion: (outgoing/energetic vs. solitary/reserved). Energy, positive emotions, assertiveness, sociability and the tendency to seek stimulation in the company of others, and talkativeness. High extraversion is often perceived as attention-seeking, and domineering. Low extraversion causes a reserved, reflective personality, which can be perceived as aloof or self-absorbed.

Agreeableness: (friendly/compassionate vs. challenging/detached). A tendency to be compassionate and cooperative rather than suspicious and antagonistic towards others. It is also a measure of one's trusting and helpful nature, and whether a person is generally well-tempered or not. High agreeableness is often seen as naive or submissive. Low agreeableness personalities are often competitive or challenging people, which can be seen as argumentativeness or untrustworthiness.

Neuroticism: (sensitive/nervous vs. secure/confident). The tendency to experience unpleasant emotions easily, such as anger, anxiety, depression, and vulnerability. Neuroticism also refers to the degree of emotional stability and impulse control and is sometimes referred to by its low pole, "emotional stability". A high need for stability manifests itself as a stable and calm personality, but can be seen as uninspiring and unconcerned. A low need for stability causes a reactive and excitable personality, often very dynamic individuals, but they can be perceived as unstable or insecure. (End quote from Wikipedia).

The prospect modeling component 214 receives the prospect data model (represented by arrow 215) and constructs a personality model that is provided as an input in various embodiments to the encoder 222, the decoder 224, and evaluator 228. In various embodiments this can be produced either as a direct modeling of a prospect's personality based upon the five factors, or a model of the probable responses of the prospect to various inputs, or both.

Figure 8A:
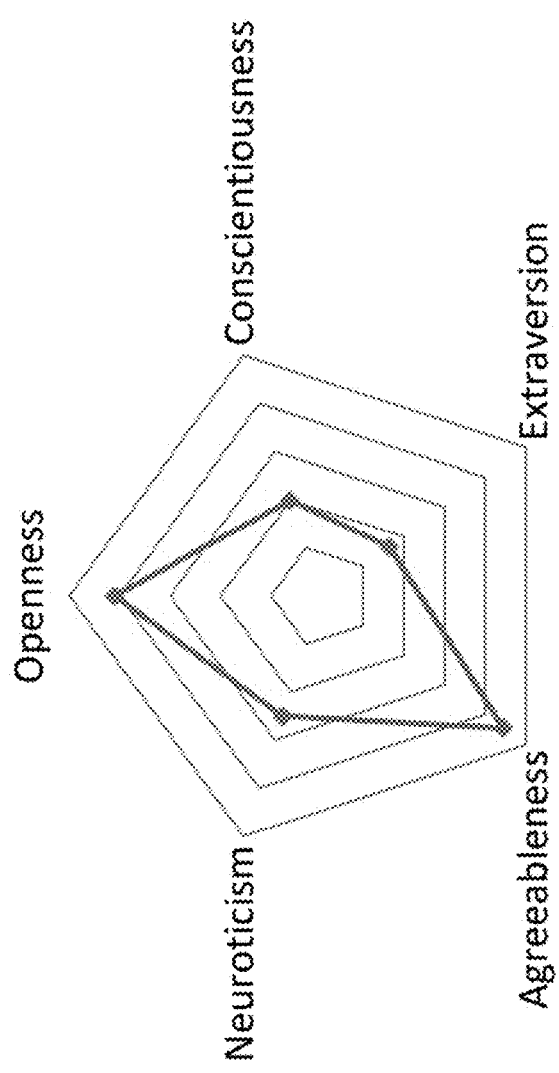
FIG. 8a shows a point representation of a personality model.
Figure 8B:
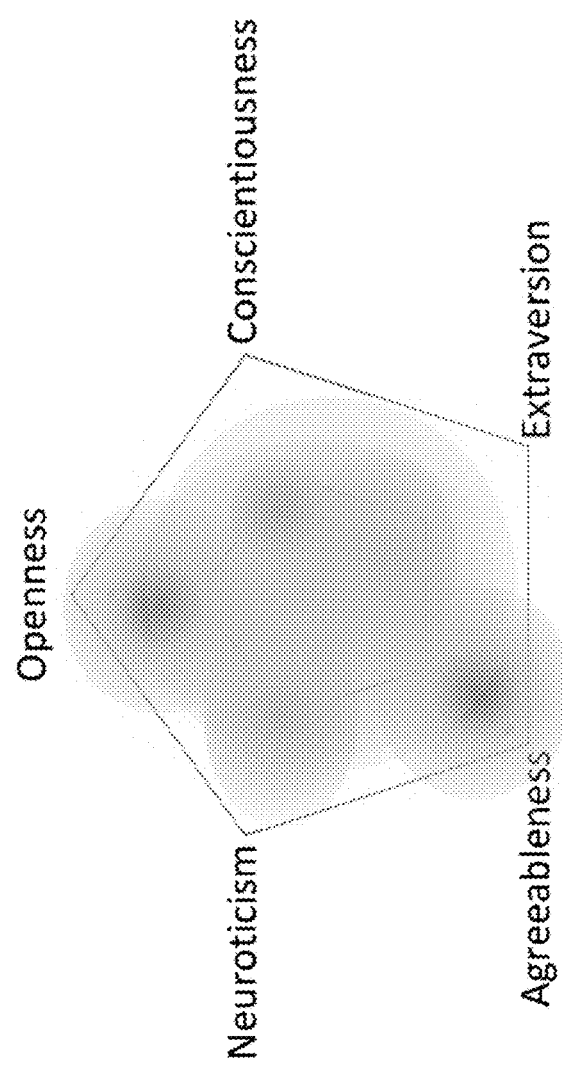
FIG. 8b shows a distribution representation of a personality model.

In the context of the system described in FIG. 2, the five factors are modeled as five latent variables associated with the factual model created by the prospect information fusion component 212. FIGS. 8a and 8b show two different ways in which this is modeled as represented on a radar graph. FIG. 8a shows the five factors as point values and FIG. 8b shows the same values but modeled as a set of overlapping distributions with the highest probability value corresponding to the point values shown in FIG. 8a. Either point values or distributions can be used, but distributions will be used in the context of the described embodiments.

Because the "true" values associated with a personality are unknown, the values need to be inferred. There are a number of ways of doing this according to different embodiments. A first embodiment uses a variation of LDA, but instead of having the topics be statistical projections over a Dirichlet prior, the limited universe of values allows the prior to be modeled as a binomial distribution over each factor of the five factor model, with the prior modeled as:

$$p(q) = \frac{q^{\alpha-1}(1-q)^{\beta-1}}{B(\alpha, \beta)} \quad \text{(Eq. 5)}$$

The intuition is that, similar to a topical model, the sets of observations provided in the prospect statements and the facts collected in the factual model can be explained by unobserved groups that explain why some parts of the data are similar—but instead of the similarity being due to topicality, the similarity is due to the outlook and perspective of the prospect.

In another embodiment, the prospect modeling component 214 is implemented using a neural classification network 900 as depicted in FIG. 9a. According to this embodiment, the neural classification network is implemented with input nodes 912, recurrent nodes 914, and output nodes 916. The number of input nodes is regularized to the dimensionality of the factual model 302, and include inputs for sequences of word embeddings (from information retrieved from the Internet) as well as inputs corresponding to locations (and location history), gender, profession (and professional history), and previous interactions. The recurrent nodes 914 are implemented using one of LSTMs, deep learning networks, or GRUs with a tan h activation function.

Recurrent network cells are chosen to maximize the breadth of inference across the factual model providing input. In another embodiment, an attention mechanism is also used to improve the correlation of different inputs to outputs of the personality model. In one embodiment, the recurrent nodes are organized in five hidden layers with sizes approximately equal to:

$$H_{1,2}=2/3(N_i)$$

$$H_3=4/3(N_o)$$

$$H_{4,5}=2/3(N_i) \quad \text{(Eq. 6)}$$

Where $H_x$ is the layer in question and $N_i$ is equal to the number of nodes in the input layer and $N_o$ is equal to the number of nodes in the output layer. This architecture is designed to allow a multifactor representation of the input in the first two hidden layers, force compression of representation (and thus information loss) in the third layer, and provide an expanded representation from the compressed value to the parameters of interest in the fourth and fifth layers. In a second embodiment, there are three hidden layers with sizes approximately equal to:

$$H_1=2/3(N_i)$$

$$H_2=1/2(N_i)$$

$$H_3=4/3(N_o) \quad \text{(Eq. 7)}$$

This embodiment proceeds from the perception that this is a multi-factor mapping problem from a higher to a lower dimensional space, so a straightforward compressive architecture should be sufficient, with the advantage of being easier to train and not suffering as much from the disappearing gradient problem. The number of output nodes 916 is sized to the personality model—in the case of the sample problem, five. This allows a point output as shown in FIG. 8a. In an additional embodiment, the output nodes are sized output both a mean and a standard deviation value. This allows a probability function output as shown in FIG. 8b. This corresponds to the intuition that the overall functioning of the prospect modeling component is a mapping from a noisy, high-dimensional space to a lower-dimensional space of known elements corresponding to personality type vectors.

As mentioned previously, the personality model of interest may not be strictly according to one of the standard personality models, but may instead be a model of the receptiveness of the prospect to a particular type of appeal. Accordingly, another embodiment stacks a second neural classification network onto the outputs of the network 900 to create deep belief network 901. Layers 922, 924 and 926 of deep belief network 901 are similar or identical to layers 912, 914, and 916 the network 900, but output layer 226 is also an input layer for a receptivity estimation network, shown as hidden recurrent layer 932 and modified output layer 934. In one embodiment, the factual model 302 or information from CRM system 216 about previous positive and negative responses can also be introduced gain via input 936 to be independently evaluated by the second portion of deep belief network 901. In an embodiment that uses a deep belief network, the receptivity estimation network includes a second layer of hidden nodes 932 would connect to the output nodes 926, with the hidden layer of approximate size:

$$H_5=4/3(N_i) \quad \text{(Eq. 8)}$$

and the output layer 934 providing a single squashed value corresponding to the projected receptiveness.

In one embodiment, the initial weights for the output nodes in network 900 or 901 use a sum of existing probabilities to initialize the network. The initial values for personality can be estimated by combining geographical personality studies (e.g., Rentfrow, P. J., Gosling, S. D. & Potter, J. (2008), "A Theory of the emergence, persistence, and expression of regional variation in basic traits," Perspectives on Psychological Science, 3, 339-369), information about personality prevalence in particular professions (e.g., Hussain, S, Abbas, M, Shahzad, K & Bukhari, S A 2011, "Personality and career choices", African Journal of Business Management, vol. 06, no. 06, pp. 2255-2260 or Barrick, M R, Mount, M K & Gupta, R 2003, 'Meta-Analysis of the Relationship between the Five-Factor-Model of Personality and Holland's Occupational Types', Personnel Psychology, vol. 56, pp. 45-74), models associated with male/female differences (e.g. Weisberg Y. J., DeYoung C. G., Hirsh J. B., 2011, "Gender differences in personality across the ten aspects of the Big Five," Front. Psychol. 2:178. 10.3389/fpsyg.2011.00178). Training then proceeds using the affective language model for five factor analysis. In another embodiment, training, validation, or prospect targeting data is obtained by directly incentivizing prospects to engage in personality tests (e.g. on Facebook). In the case of a deep belief network, training of the second portion of the deep belief network is accomplished using historical interaction data from CRM system 216.

Turning back to FIG. 2, the output of the prospect modeling component 210 is a continuous, real-valued multidimensional field in one or more dimensions representing known or inferred aspects of the personality and receptivity of the prospect to a particular appeal. This representation of the prospect is fully differentiable, allowing the exploration of the emotional/persuasive state space using a VAE, GAN, or Adversarial VAE.

Figure 10:
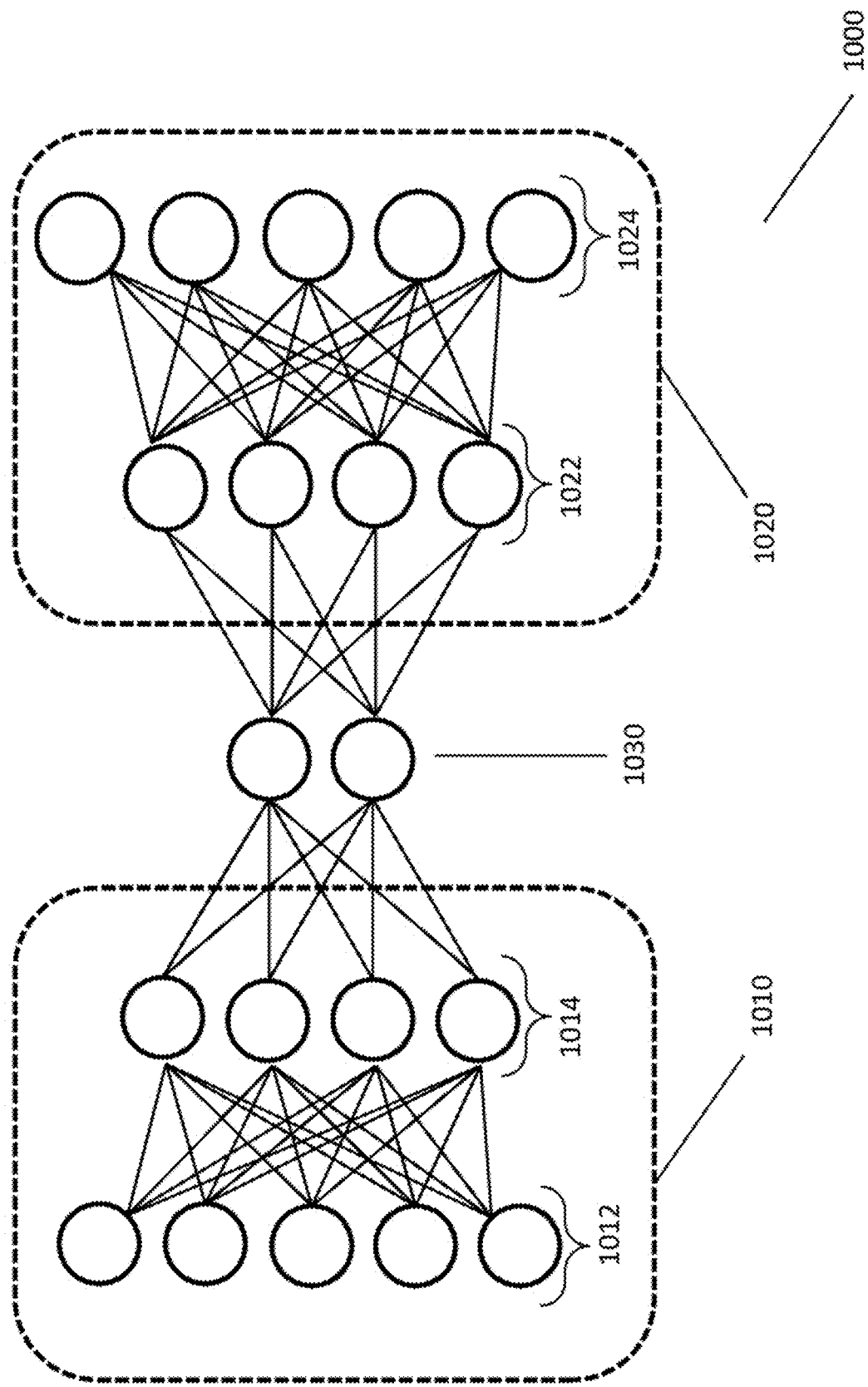
FIG. 10 shows an encoder-decoder network according to one embodiment.

Turning to the text generation component 220, one embodiment uses a VAE encoder/decoder model. VAEs are generative models based upon a regularized autoencoder. Instead of just encoding the mapping from inputs to outputs, the VAE internally breaks the representation into a prior distribution and a learned posterior model. FIG. 10 shows one embodiment of encoder 222 and decoder 224 together with code 223. Encoder 1010 is a variational inference network, mapping observed inputs to posterior distributions over latent space. Decoder 1020 is a generative network, mapping the latent variable values back into distributions over the original data space. Between these two is the compressed data representation, or code 1030 recording the underlying latent variables. VAEs are modular, with different encoder/decoder pairs substitutable for each other depending on whatever works best for the task at hand. In various embodiments these can include recurrent neural networks (RNNs), convolutional/deconvolutional neural networks (CNNs) or other architectures. Within the encoder 1010 are a set of input nodes 1012 in an initial layer and hidden nodes 1014 in one or more hidden layers. In a typical VAE architecture, the number of nodes in the hidden layers reduces by a constant fraction (usually ½) in each hidden layer, with a learning rate and loss function between each layer. For example, a typical VAE may have 1024 input nodes, then 512, 256, 128, 64, 32, and 16 in the hidden layers represented by nodes 1014. A final reduction leads to the compressed data representation 1030, which may have, for example, only 8 nodes in one embodiment. The decoder 1020 is typically the mirror image of the encoder, with an equivalent number of hidden layers represented by nodes 1022 (e.g., 16, 32, 64, 128, 256, and 512) and the output layer 1024 having an equal number of outputs to the input.

Figure 11A:
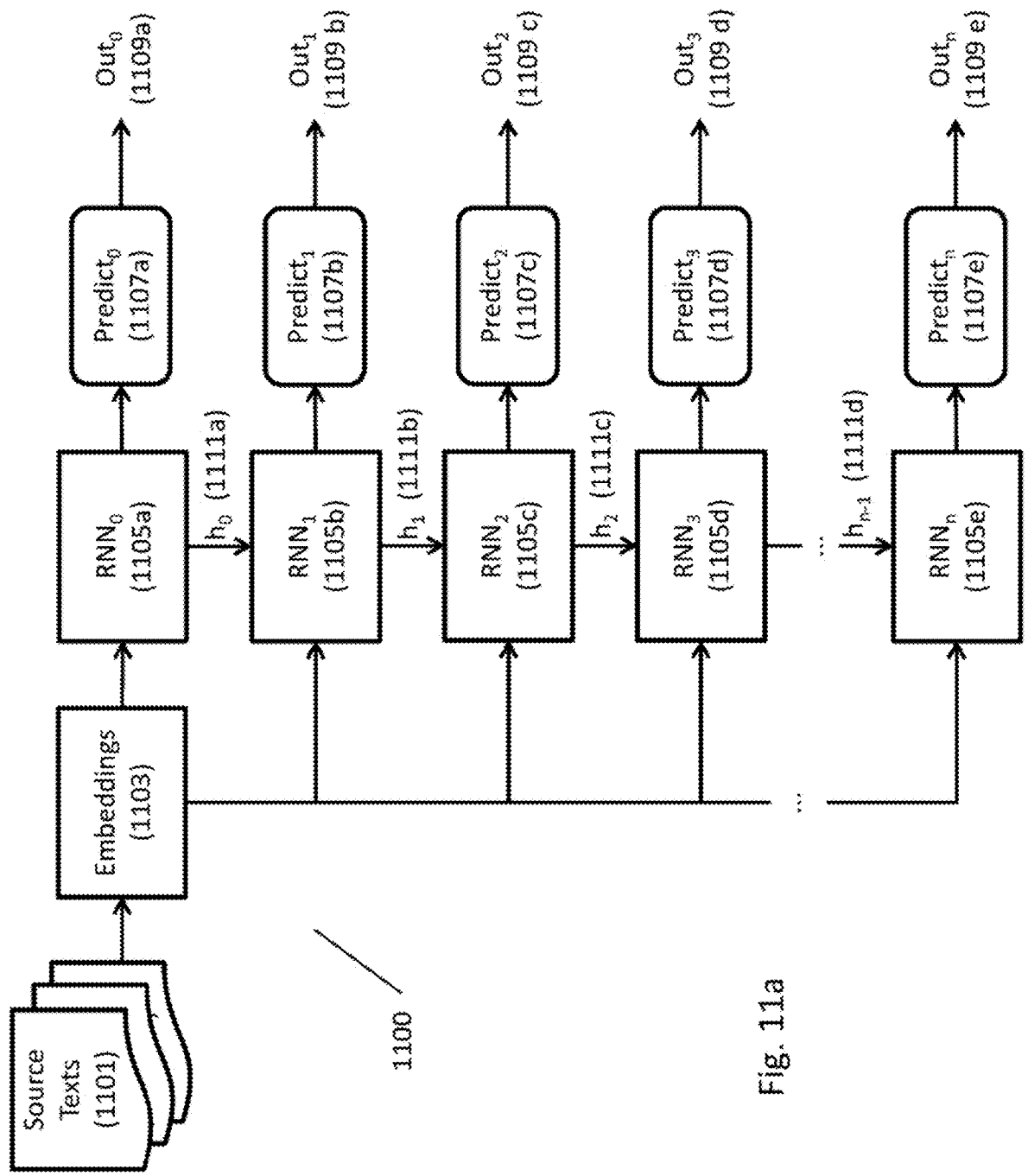
FIG. 11a shows an RNN model according to one embodiment.

In one embodiment, the specific VAE used for the text generation component 220 uses a sequence-to-sequence (seq2seq) model with attention. An implementation of this model will be described in FIGS. 11a-11c according to various embodiments. The system 1100 shown in FIG. 11a is an RNN model according to one embodiment. The model takes a set of input documents 1101 (in this case, each sentence of source text 201), preprocesses and converts the words into corresponding embeddings 1103 based upon an existing trained embedding model (e.g. word2vec, Glove, Conceptnet Numberbatch). The embeddings are then repeatedly provided as inputs to RNN cells 1105a-e, with each of 1105a-e corresponding to a different fully connected hidden layer. The hidden layers are connected by feedforward networks 1111a-d, each of which provides an intermediate prediction 1107a-e mapping the computed output of the RNN to a probability distribution over candidate tokens by applying a softmax transformation, and the corresponding prediction output 1109a-e which picks the maximum likelihood token given the probability distribution. The final predicted output is taken from the output of the final layer. Each RNN cell 1105 computes the overall loss of the network on a single pair. It runs the network over the input, and for each input, computes the distribution of possible outputs, and computes the cross-entropy loss for each character. In each case, the feedforward network can be trained using teacher forcing; one embodiment uses a 25% probability of teacher forcing on any connection 1111.

Figure 11B:
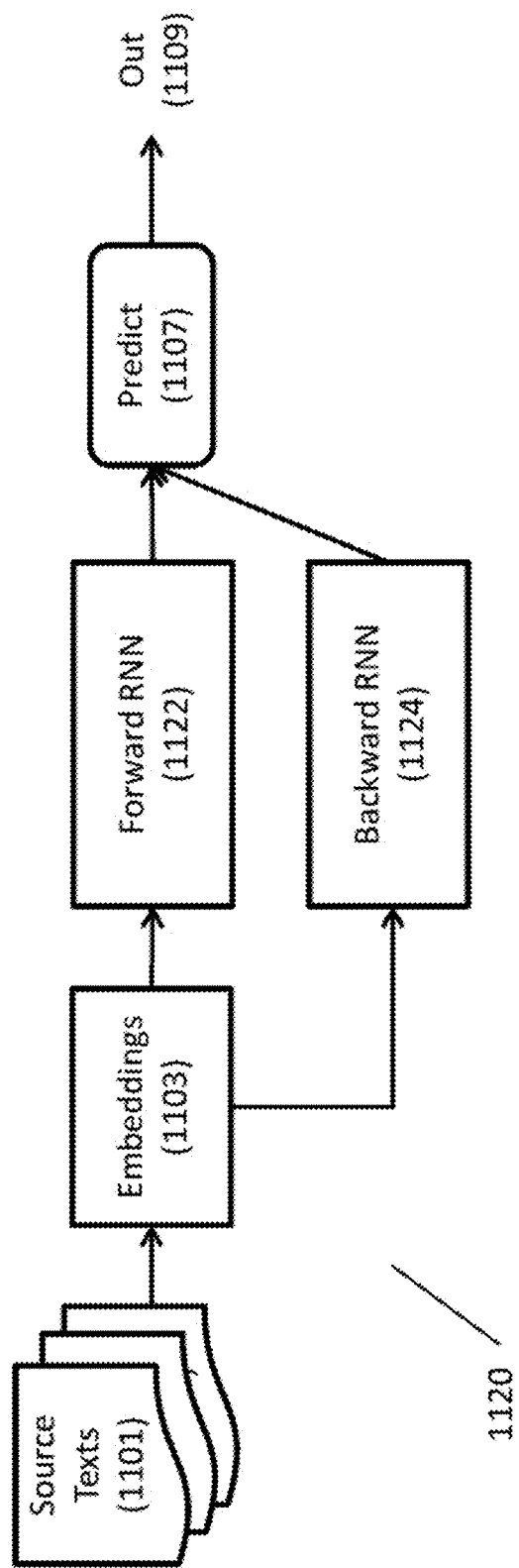
FIG. 11b shows a modified RNN model according to one embodiment.

Turning now to FIG. 11b, one modification that improves performance is a system 1120 that adds a parallel backwards RNN that consumes tokens from the back of the sentence to the start. The prediction for the next token is the sum of the two RNNs. Forward RNN 1122 is an implementation of an RNN 1100 as described relative to FIG. 11a. Backward RNN 1124 is also an implementation of RNN 1100, except for the sequence of tokens provided by embeddings component 1103 is provided from the end of the sentence to the beginning, rather than from the beginning to the end. Each forwards/backwards pair is arranged in parallel layers, mirroring the layout described relative to FIG. 11a.

Figure 11C:
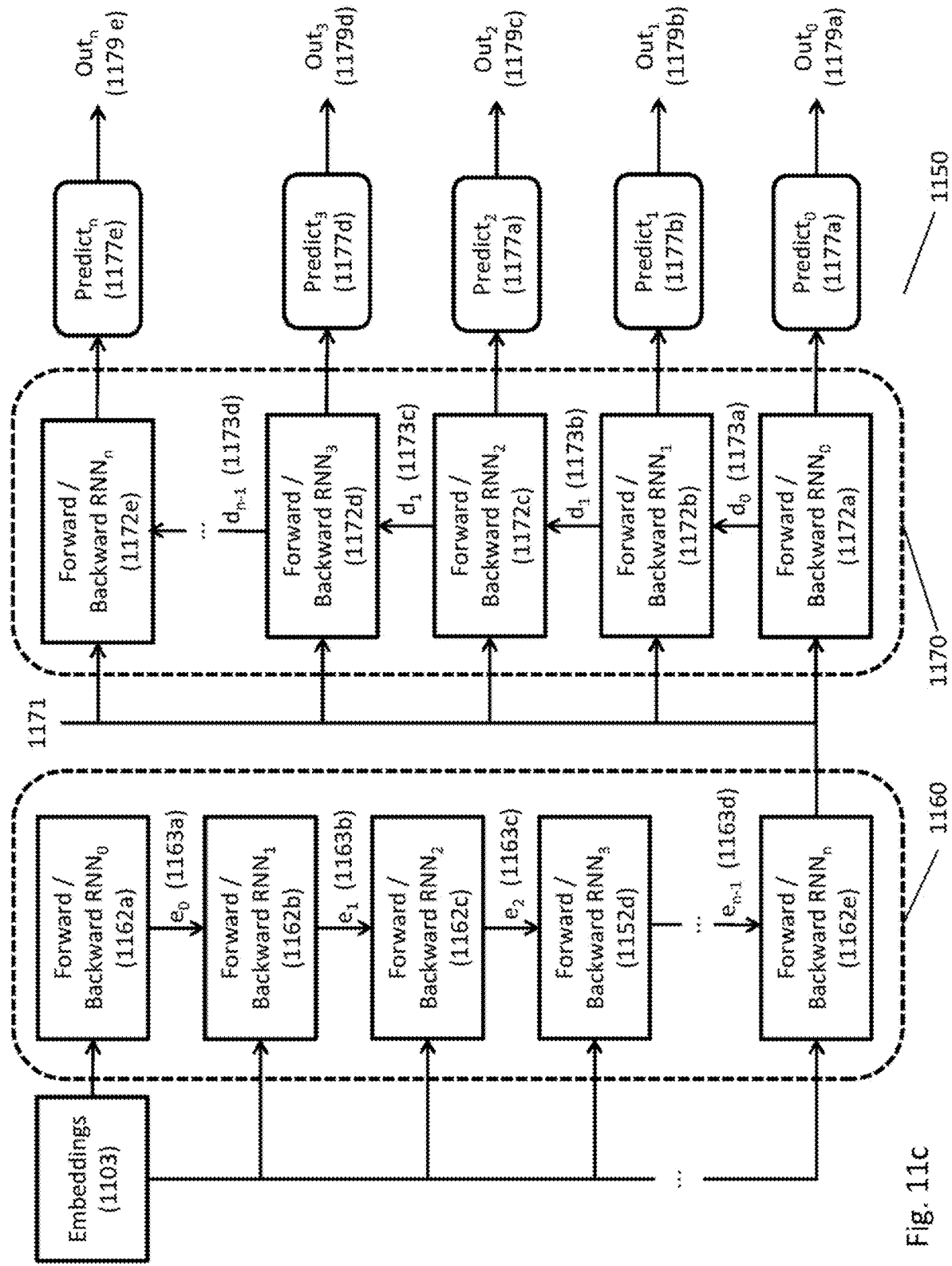
FIG. 11c shows a forward/backward RNN model in an encoder/decoder configuration.

Turning now to FIG. 11c, the forward/backward RNN model is shown in an encoder/decoder configuration, with group 1160 corresponding to encoder 1010 of FIG. 10 (itself corresponding to encoder 222 of FIG. 2) and group 1170 corresponding to decoder 1020 of FIG. 10 (itself corresponding to decoder 224 of FIG. 2). Each block 1162a-e is a forwards/backwards RNN layer as described relative to FIG. 11b, arranged in an n-deep stack of encoding layers where each layer is approximately ½ the size of the previous layer. The outputs of forward/backward RNN encoder n (1162e) are connected to the inputs of forwards/backwards RNN decoder 0 (at 1172a). The forward/backward decoder networks 1172a-e each create a prediction at 1177a-e and outputs 1179a-e and the final prediction output 1179e is a representation of the highest-likelihood next token considering the full context of the sentence based upon the latent representation learned by the encoder 1160. Also, in one embodiment, each RNN 1172 is also provided with the value of the prospect personality model at input 1171.

Figure 11D:
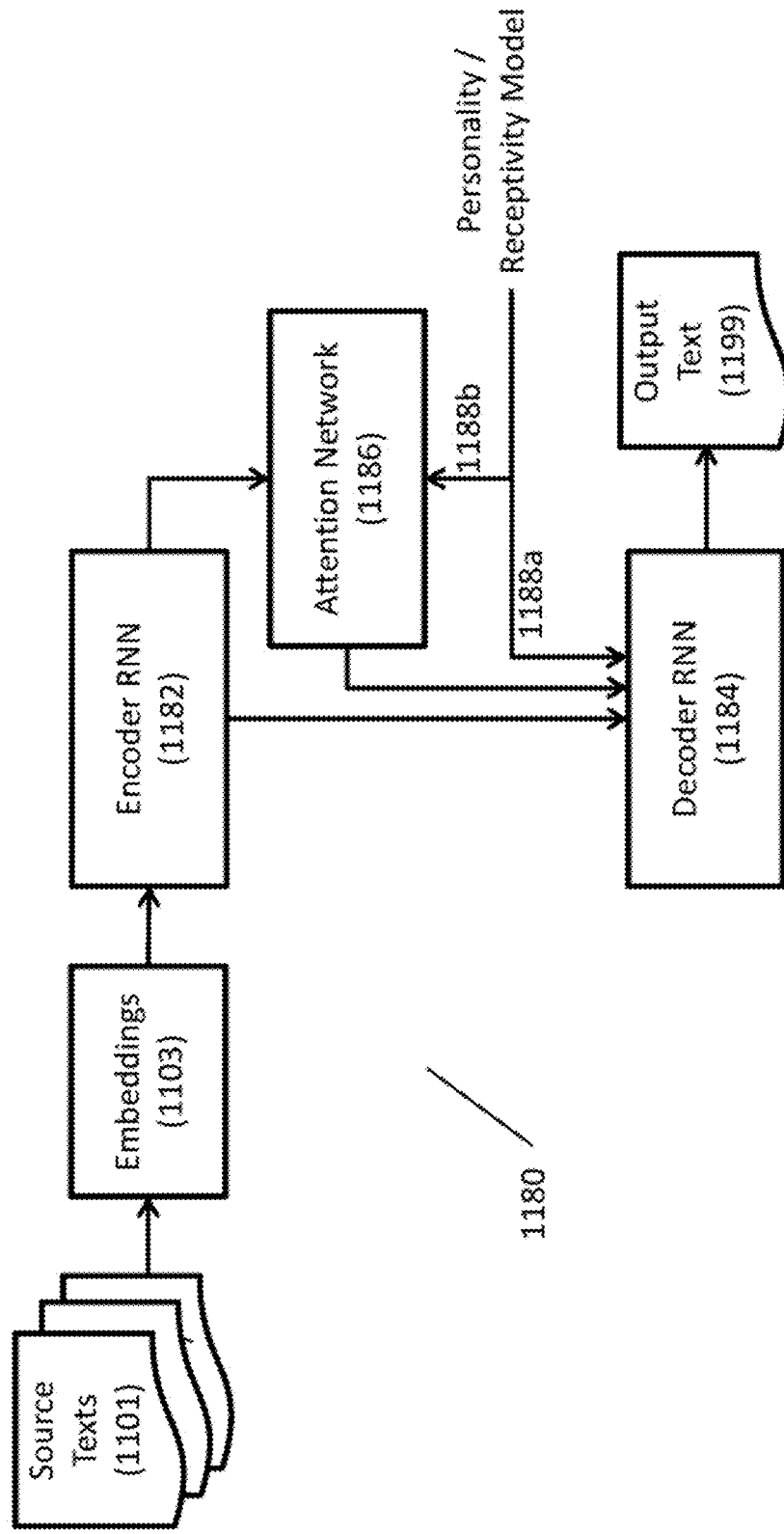
FIG. 11d shows a modified encoder-decoder network with attention mechanism and personality input.

Two additional elements are included in various embodiments as shown in FIG. 11d. System 1180 is the encoder-decoder network 1150 as described in FIG. 11c, with encoder RNN 1182 corresponding to component 1160 of FIG. 11c, and decoder RNN 1184 corresponding to component 1170 of FIG. 11c. These components take the embeddings 1103 and create an output that is embodied in output text 1199. In addition, the decoder RNN 1184 takes two additional inputs. First, attention network 1186 takes as input the internal state of the encoder network (outputs 0 . . . n of each layer of the encoder network, corresponding to each output 1109 as shown in FIG. 11b) and itself provides an input to decoder RNN 1184. Second, the decoder RNN 1184 takes as an input the personality/receptivity model at 1188a (corresponding to the output of prospect modeling component 210 of FIG. 2). In another embodiment, the personality model is also provided to attention network 1186 at 1188b. In a further embodiment (not shown), the personality model is also provided as an input to the encoder RNN 1182 in parallel with the embeddings.

Figure 12A:
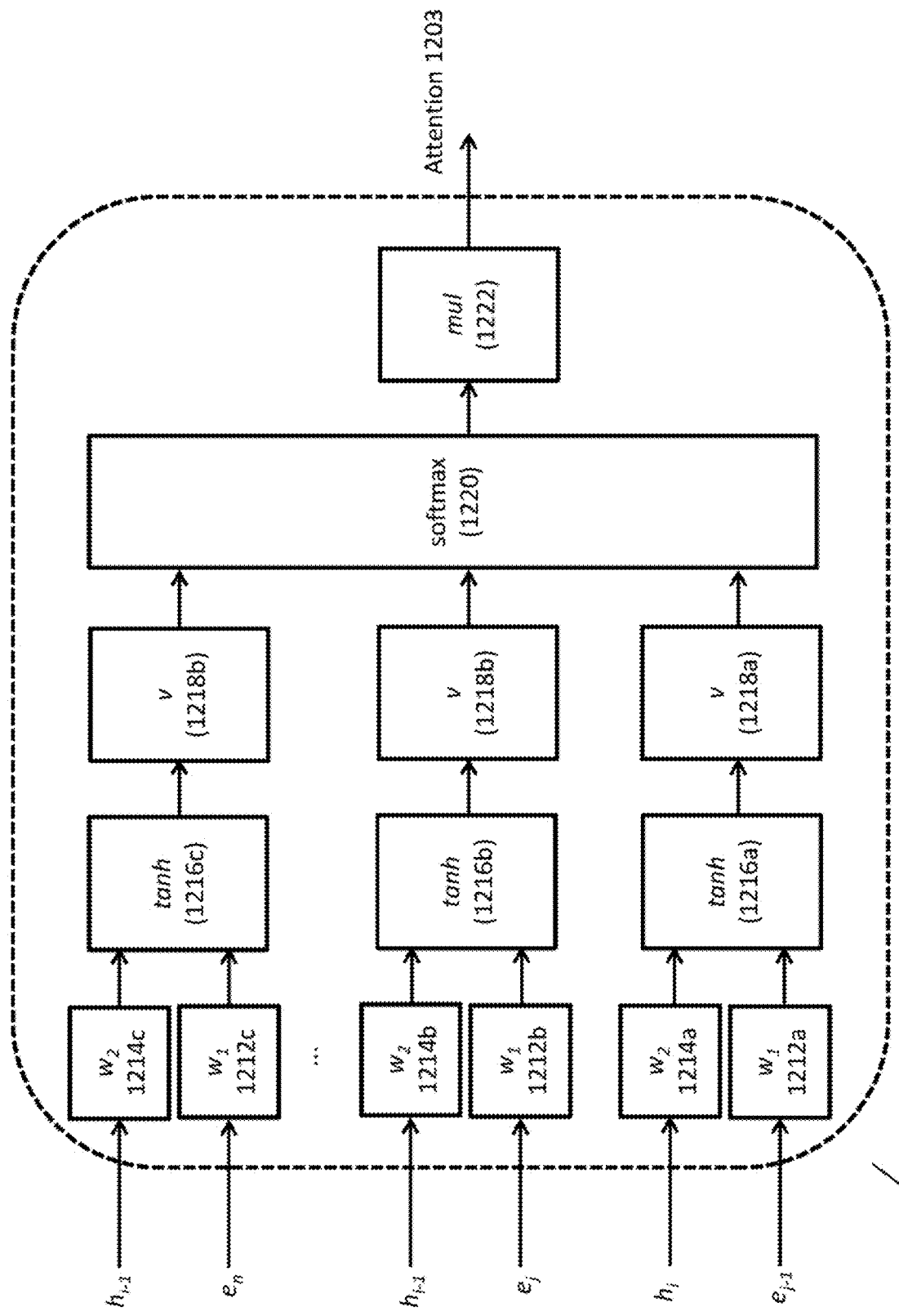
FIG. 12a shows an implementation of an attention network according to one embodiment.

FIG. 12a shows how the attention network 1186 is implemented according to one embodiment, designated at 1200. For each encoded input e from the encoder RNN, the attention network calculates:

$$\text{attention}_{ij} = v \cdot \tan h(e_i \cdot w_1 + h_j \cdot w_2) \quad \text{(Eq. 9)}$$

A particular encoded vector $e_i$ at decoding step $h_j$ is multiplied by parameters w1 (at 1212a-c), $w_2$ (at 1214a-c), with the outputs combined via tan h activation function (at 1216a-c) and weighted by v (at 1218a-c), with $w_1$, w2, and v as learned parameters. The attention score for each encoded vector is calculated by normalizing the vectors via softmax function 1220 and then multiplying the output by its weight, which is fed to each layer of the decoder RNN.

Figure 12B:
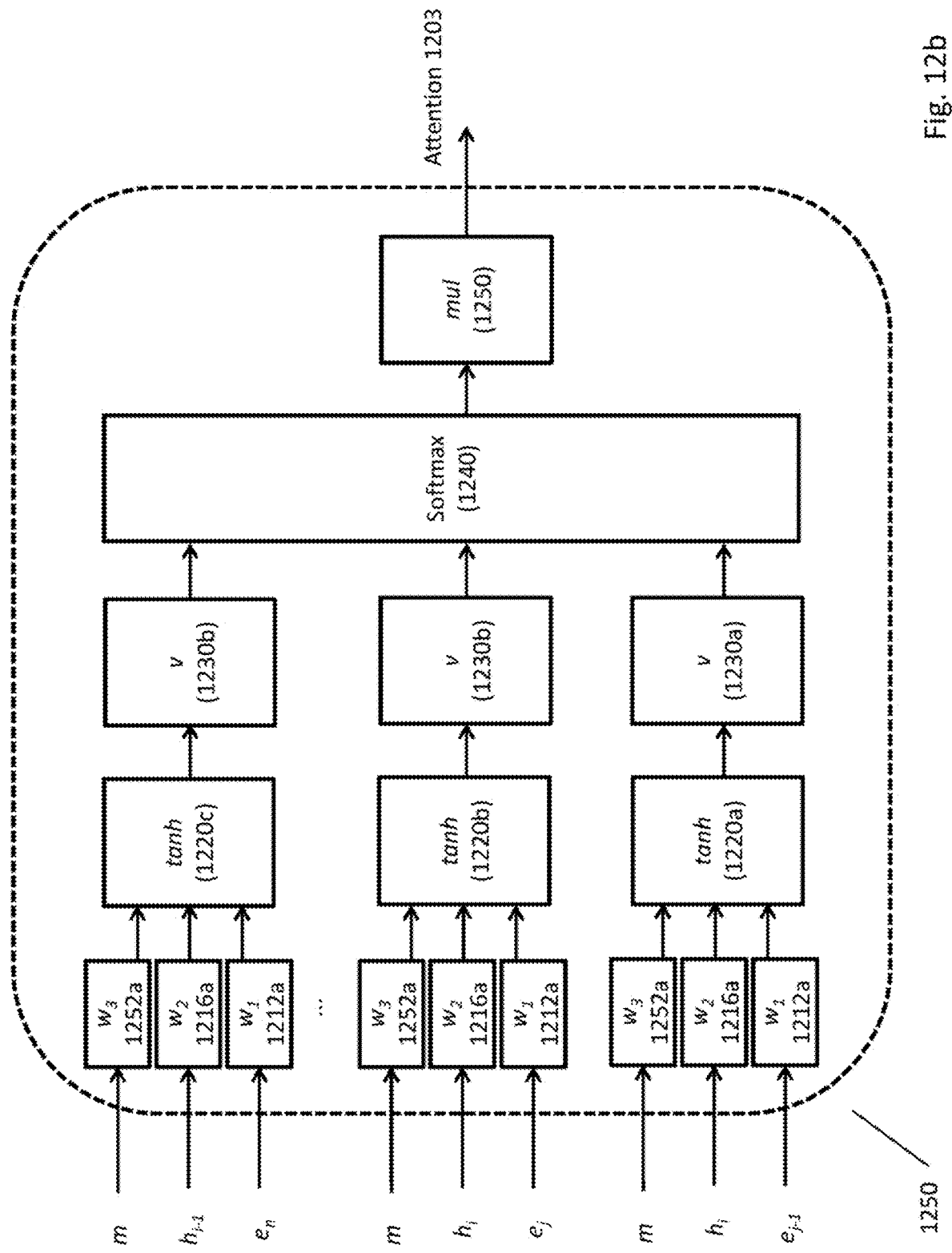
FIG. 12b shows a second implementation of an attention network according to one embodiment.

FIG. 12b shows a second embodiment 1250 that also utilizes the prospect model for the calculation of attention. The components of attention network 1250 are identical to attention network 1200 except that there is an additional learned parameter $w_3$ (at 1252a-c) that is multiplied with personality model m for each vector $e_i$ at decoding step $h_j$. This makes the attention function:

$$\text{attention}_{ij} = v \cdot \tan h(e_i \cdot w_1 + h_j \cdot w_2 + m \cdot w_3) \quad \text{(Eq. 10)}$$

Returning to the overall system description in FIG. 2, the difference between these different embodiments described above is whether the personality model is used as an explicit input into the encoder/decoder (and attention) components or whether the prospect model is only used in the evaluation of the output by evaluator 228. In each embodiment the personality model is driving the generation of the text, but providing the model as an input to the encoder/decoder allows for higher performance.

The output of decoder 224 is a candidate text. For training purposes, the candidate text is analyzed via evaluator 228 and possibly discriminator 226, as these components contain complementary networks that provide the feedback function for training purposes. In one embodiment, the evaluator 228 and discriminator 226 are also used during final generation of the output text as a final check, but this is not necessary in all embodiments, as the learned weights in the encoder/decoder network should be sufficient to generate an output text matching the personality model and statistical inputs.

For example, in one embodiment, the relative weights of the encoder and decoder networks are iteratively updated based on a comparison of the source and generated text. In this embodiment, the source text is summarized using an extractive summarization procedure (as discussed relative to FIG. 1) and the output evaluated to identify the relative order and precedence of the essential words and phrases in the source text, including any pinned words or phrases. A similar process is applied to the generated text, abstracting away the difference in syntax and identifying the shared underlying meaning. If there is too great a difference in the measured semantic content, then a negative feedback signal can be re-input to the encoder and decoder, and a successful maintenance of semantic content can be reinforced via a positive feedback result. Once the feedback has propagated through the system and updated the relative weights associated with encoding and decoding, a new candidate generated text can be generated and measured. Other types of semantic or syntactic variance or maintenance can be similarly maintained, including any of the types of text measurements identified relative to FIG. 1. A further description of the structures that enable the specific performance of this encoder-decoder generator follow.

An implementation of evaluator 228 according to one embodiment is shown at 1300 in FIG. 13. At a high level, the evaluator 228 takes in the candidate text at 1301 as well as information about the source text at 1302. The information about the source text could be the source text itself or it could be a set of measurements that correspond to targets for the output text as described relative to FIG. 1. The evaluator also takes the prospect model 1303 and using all the information provided creates output 1304, where the output is a measure of "quality" and "fit" of the candidate generated text to both the objective measurements associated with matching some of the statistical qualities of the source text, as well as a measure of fit to the prospect personality model.

Within the evaluator component are a number of major subcomponents. Over all the subcomponents, the general strategy is for minimization of the computed value for the candidate text against some relevant distribution defined either on the source text or the prospect personality model. Statistical measurement component 1310 counts words, paragraphs, and quantifies the high-level "visual" structure. The values for the candidate text are identified and the result is compared against the corresponding computed values for the source text. If the value for the candidate text is acceptable, as measured by the likelihood of the candidate's computed value given a normal distribution around the value computed for the source text. Grammar component 1320 measures the grammatical correctness of the output text according to a standard linguistic and semantic model. Detected deviations from normal grammar are scored according to their severity and the score is minimized. Readability component 1330 measures readability according to one or more text complexity models as discussed relative to FIG. 1. Although the general rule is that one objective is for the complexity of the generated text to match the complexity of the source text, a higher or lower level of complexity may be more or less persuasive according to the personality model. Accordingly, the output of the readability component 1330 is provided directly as the output rather than a variance from the source text. Five factor analysis component 1340 measures the "expressed personality" of the candidate text according the affective words model used to correlate different common expressions and word choices with the standard personality model being used (in the example, the five factor model of personality). In one embodiment, the value being minimized is the difference between the personality model and the "personality" expressed through the candidate text. In one embodiment, this is measured indirectly by evaluating the candidate text as a possible input to the prospect modeling component 210 of FIG. 2. A candidate text where the measured "surprise" is low (as measured by the magnitude of the updates that would be required to backpropagate through the model to take into account the new observation) is judged to be a "better" text in the sense that it more closely matches the prospect's view of the world.

In the context of the example task, the summarization component 1350 is designed to maintain essential information that is necessary to be effective at marketing a particular product or service. In one embodiment, the ROUGE score of the candidate text is compared with the ROUGE score of the source text to compute the information loss associated with the alternative expression. In another embodiment, the key words, noun and verb phrases are extracted and the linguistic distance between set(keywords, phrases)$_{source}$ and set(keywords, phrases)$_{candidate}$ should be minimal. In a further embodiment, the summarization component additional checks for the existence of pinned phrases as described herein below.

The outputs of statistical measurement component 1310, grammar component 1320, readability component 1330, five factor analysis component 1340, and summarization component 1350, together with the candidate text 1301 and the prospect model are then entered as inputs to RNN 1360. RNN 1360 is a forward/backward RNN implemented in a neural network essentially similar to the system described relative to FIG. 11b. However, the output 1304 is not a code corresponding to the latent content of the candidate text, but is instead an approximation of the "quality" and "persuasiveness" of the candidate text with reference to prospect model 1303. By training the network with a different objective, the learned weights allow the specialization of the network for a different task: combining the statistical, grammar, and readability outputs with the information and emotional tenor of the candidate text to produce a measurement of both the soundness of the text as well as its emotional confluence with the prospect.

Discriminator component 226 is an adversarial network designed to test the "humanness" of a particular candidate text. Again, the discriminator component 226 is implemented similarly to the system described relative to FIG. 11b, but the output is squashed to a binary objective of "natural" or "generated" for the text. Note that an embodiment using discriminator 226, either with or without evaluator 228, can be considered part of an adversarial VAE or a GAN. In the instance where the discriminator 226 is used as the adversarial network to test the generation of the text, the use of the personality model can be used as the continuous output against which the model can be updated. A traditional GAN is generally ineffective for the generation of natural language because of the discontinuous nature of text (unless REINFORCE is used as the optimization method). In contrast, the mating of the two elements of the evaluator 228 for the adversarial evaluation of the discontinuous text and the discriminator 226 for the adversarial evaluation of the continuous personality manifold created by the prospect modeling component allows the use of standard stochastic gradient descent for the emotional targeting of the generated text and a paired "acceptor" function that only generates plausible "correct" text.

Once the generated text 203 is created, the final component in the system of FIG. 2 is the campaign component 230. There are a number of different ways in which this can be implemented, and the specific type of campaign (email, text or other messaging, website, banner ad, podcast script) are not relevant to the current system. The function of the campaign component is solely to close the feedback loop by testing the generated text 203 against the prospect that has been modeled to see if the specific phrasing and information used in the generated text is persuasive and induces the desired response. If it is so, then the successful interaction is stored in CRM system 216, along with the prompt that induced the response, and the system begins again.

Two further refinements are contemplated in various embodiments of the system described herein. First, in the context of the sample task, the "prospect" has been thought of as a singular person, and information about the identified person is retrieved from the internet or inferred in order to create the prospect model. However, those of skill in the art will note that the prospect model is a model of personality as expressed as a vector of weights or probabilities in personality space. It does not actually contain information that is necessarily unique to the prospect. With that concept in mid, the "nearest neighbors" in personality space can be grouped into models that have broader applicability than a single person. Note that this is distinct from grouping according to demographics, social groupings, or expressed interests as are currently known in the art. This grouping is by measurement of personality or persuasive factors. Other demographic or interest-based groupings can be considered in various expressions of the latent personality model described herein.

Grouping possible prospects by personality model has a number of advantages in various scenarios. In one embodiment, it avoids the "cold start" problem when first interacting with a new prospect. Any sort information that can be gathered about the prospect can be used to "localize" the possible prospect within the personality model space, and thus create a first working model used to generate texts suitable for interaction with the prospect. Subsequent success or failure (as recorded by campaign component 230) is then used to update the model and further isolate the correct grouping for the particular prospect.

Further, even a perfectly crafted text may not result in the desired interaction with the prospect due to extraneous complicating factors—other purchases, immediate needs, distraction, etc. By generalizing the prospect model to cover personality "neighbors" in the model space, the success of the model can be better evaluated as against a baseline non-aligned text or a null hypothesis model.

The second refinement applicable to various embodiments is the use of "pinned text." A pinned text is a series of words or other tokens that are isolated during the pre-processing phase so that the phrasal structure will always be maintained for any pinned text components introduced into the generated text. There are a number of advantages in various embodiments that can use pinned texts. Even if including the pinned text reduces the overall model "fit," there are business and legal reasons why particular phrases must be included verbatim. For example key usage or legal terms, such as a trademarked business motto or a required disclosure statement, can be guaranteed to occur in the output in the right order. Second, the use of pinned text can reduce the scope needed to be handled by the text generation component, increasing the overall fitness of various generated texts (even if the total heterogeneity goes down).

According to one embodiment, pinned text phrases are identified by splitting the generated sentences into parts of speech including noun and verb phrases (such as described relative to FIG. 4a). Identified pinned texts are then re-encoded as a single multi-word token instead of a series of tokens with an underlying probability. In a second embodiment, the conditional probability of the expression of the tokens making up the pinned text is set to 1 inside the identified pinned text phrase, making the generation of the next token within the pinned text phrase the absolute most likely outcome. Note that the probability-based implementation described according to the second embodiment above would need an additional state element "in token" (or similar) to reset probabilities for words differently depending on the state of the text generation output.

In one embodiment, the correct use of the pinned phrases is monitored in the text summarization component 1350, where any identified pinned text phrases identified are passed in as part of source information 1302. Separate from the programmatic summarization of the text content, a text match to the pinned text phrases (including, as needed, minor wildcarding to cover differences in possessive use, gender, etc.) is verified before or as a part of the creation of the text summary. It is relatively efficient to handle the identification and verification of pinned text phrases in the summarization component 1350 because in many cases, the pinned phrase itself will be of high descriptive value and likely part of the summary.

Although the various operations are described herein in a specific order, it should be understood that other operations may be performed in between the described operations, or operations may be adjusted so that they occur at slightly different times, or may be distributed in a system which allows the occurrence of the processing operations at various intervals associated with the processing, as long as the processing of the overlay operations are performed in the desired way. Further, a range of modification, change and substitution is contemplated in the foregoing disclosure and in some instances, some features of the embodiments may be employed without a corresponding use of other features. In particular, various embodiments and inventions herein allow the replacement of different neural network models without departing from the scope contemplated.

The invention claimed is:

1. A method for maintaining a specific semantic content in a generated natural language text, the method comprising:
    identifying words or phrases essential to the specific semantic content of a source text;
    performing an evaluation of the source text,
    wherein the evaluation includes a first summarization procedure, followed by a first measurement of a relative order and precedence of essential words and phrases in a source summarization result;
    encoding the source text in a neural sequence-to-sequence encoder-decoder to generate a code;
    sampling from a distribution implied by the code to create a candidate generated text;
    performing an evaluation of the generated text,
    wherein the evaluation of the generated text includes a second summarization procedure, followed by a second measurement of the relative order and precedence of the essential words and phrases in a generated summarization result;
    computing a first difference between the first measurement and the second measurement;
    in response to the first difference being greater than an essential similarity threshold, providing a negative feedback response to the encoder and decoder; and
    in response to the first difference being less than the essential similarity threshold, providing a positive feedback response to the encoder and decoder; and
    updating internal weights associated with the encoder and decoder in response to the feedback.

2. The method of claim 1, wherein in response to the first difference being greater that the essential similarity threshold, the encode, decode, and evaluation steps are repeated until the first difference is less than the essential similarity threshold.

3. The method of claim 1, wherein the performing of the evaluation further comprises computing a source statistical measurement associated with a length and textual form of the source text, and wherein the evaluation of the generated text includes computing a generated statistical measurement comparable to the source statistical measurement and computing at least one statistical similarity measurement based on a comparison of the source statistical measurement and the generated statistical measurement.

4. The method of claim 1, wherein the performing of the evaluation further comprises computing a source readability measurement associated with a length and textual form of the source text, and wherein the evaluation of the generated text includes computing a generated readability measurement comparable to the source readability measurement and computing at least one readability similarity measurement based on a comparison of the source readability measurement and the generated readability measurement.

5. The method of claim 4, wherein the readability similarity measurement is compared relative to an expected reading capacity of a prospect.

\* \* \* \* \*